US007523063B2

(12) United States Patent
Harrington et al.

(10) Patent No.: US 7,523,063 B2
(45) Date of Patent: *Apr. 21, 2009

(54) PROCESS AND APPARATUS FOR CONDUCTING AUCTIONS OVER ELECTRONIC NETWORKS

(75) Inventors: Myles C. S. Harrington, Pittsburgh, PA (US); Daniel J. Veres, West View, PA (US); Robert M. Panoff, Durham, NC (US)

(73) Assignee: Muniauction, Inc.

( * ) Notice: Subject to any disclaimer, the term of this patent is extended or adjusted under 35 U.S.C. 154(b) by 701 days.

This patent is subject to a terminal disclaimer.

(21) Appl. No.: 10/613,319

(22) Filed: Jul. 7, 2003

(65) Prior Publication Data

US 2004/0059646 A1 Mar. 25, 2004

Related U.S. Application Data

(63) Continuation of application No. 09/666,559, filed on Sep. 21, 2000, now abandoned, which is a continuation of application No. 09/087,574, filed on May 29, 1998, now Pat. No. 6,161,099.

(60) Provisional application No. 60/047,876, filed on May 29, 1997.

(51) Int. Cl.
*G06Q 40/00* (2006.01)
(52) U.S. Cl. .............................. 705/37; 705/26; 705/35
(58) Field of Classification Search .................. 705/37, 705/38, 35, 26
See application file for complete search history.

(56) References Cited

U.S. PATENT DOCUMENTS 3,581,072 A 5/1971 Nymeyer (Continued)

FOREIGN PATENT DOCUMENTS

| WO | WO 98/34187 | 8/1998 |
| WO | WO 99/19821 | 4/1999 |

OTHER PUBLICATIONS

Liederman, Erica. Java in the real world; Java is changing the way companies market products on the Internet. Java World. Mar. 1996. p. 1-5.*

(Continued)

*Primary Examiner*—James P Trammell
*Assistant Examiner*—Jamie H Swartz
(74) *Attorney, Agent, or Firm*—Nixon & Vanderhye PC

(57) ABSTRACT

An apparatus and process for conducting auctions, specifically municipal bond auctions, over electronic networks, particularly the Internet, is disclosed. The auctioneer maintains a web site from which information about bonds to be auctioned can be obtained. A user participates in the auction by accessing the web site via a conventional Internet browser and is led through a sequence of screens that perform the functions of verifying the user's identity, assisting the user in preparing a bid, verifying that the bid conforms to the rules of the auction, displaying to the user during the course of the auction selected bid information regarding bids received and informing the bidder how much time remains in the auction. The user may be given the option of confirming the accuracy of his bid before submitting the bid. The auctioneer is able to review bidding history, determine the winner and notify the winner over the network, and display selected auction results to bidders and observers over the network.

54 Claims, 15 Drawing Sheets

U.S. PATENT DOCUMENTS

| | | | |
|---|---|---|---|
| 4,674,044 A * | 6/1987 | Kalmus et al. ................. | 705/37 |
| 4,789,928 A * | 12/1988 | Fujisaki ....................... | 705/37 |
| 4,799,156 A | 1/1989 | Shavit et al. | |
| 4,845,739 A * | 7/1989 | Katz ....................... | 379/92.03 |
| 4,903,201 A | 2/1990 | Wagner | |
| 4,980,826 A | 12/1990 | Wagner | |
| 5,003,473 A | 3/1991 | Richards | |
| 5,077,665 A | 12/1991 | Silverman et al. | |
| 5,101,353 A | 3/1992 | Lupien et al. | |
| 5,136,501 A * | 8/1992 | Silverman et al. ............. | 705/37 |
| 5,227,967 A | 7/1993 | Bailey | |
| 5,230,048 A | 7/1993 | Moy | |
| 5,231,571 A | 7/1993 | D'Agnostino | |
| 5,243,515 A | 9/1993 | Lee | |
| 5,270,922 A | 12/1993 | Higgins | |
| 5,297,031 A * | 3/1994 | Gutterman et al. ............ | 705/37 |
| 5,375,055 A | 12/1994 | Togher et al. | |
| 5,497,317 A | 3/1996 | Hawkins et al. | |
| 5,502,637 A | 3/1996 | Beaulieu et al. | |
| 5,640,569 A | 6/1997 | Miller et al. | |
| 5,724,524 A | 3/1998 | Hunt et al. | |
| 5,749,785 A * | 5/1998 | Rossides ...................... | 463/25 |
| 5,774,176 A | 6/1998 | Carter | |
| 5,774,873 A | 6/1998 | Berent et al. | |
| 5,774,880 A | 6/1998 | Ginsberg | |
| 5,778,367 A | 7/1998 | Wesinger, Jr. et al. | |
| 5,794,207 A | 8/1998 | Walker et al. | |
| 5,794,212 A | 8/1998 | Mistr, Jr. | |
| 5,794,219 A * | 8/1998 | Brown ......................... | 705/37 |
| 5,797,127 A | 8/1998 | Walker et al. | |
| 5,802,501 A | 9/1998 | Graff | |
| 5,803,500 A | 9/1998 | Mossberg | |
| 5,809,483 A | 9/1998 | Broka et al. | |
| 5,812,987 A | 9/1998 | Luskin et al. | |
| 5,818,914 A * | 10/1998 | Fujisaki .................. | 379/93.12 |
| 5,835,896 A * | 11/1998 | Fisher et al. .................. | 705/37 |
| 5,845,265 A | 12/1998 | Woolston | |
| 5,845,266 A | 12/1998 | Lupien et al. | |
| 5,857,176 A | 1/1999 | Ginsberg | |
| 5,862,223 A | 1/1999 | Walker et al. | |
| 5,866,889 A | 2/1999 | Weiss et al. | |
| 5,890,138 A * | 3/1999 | Godin et al. .................. | 705/26 |
| 5,905,974 A * | 5/1999 | Fraser et al. ............. | 705/36 R |
| 5,905,975 A * | 5/1999 | Ausubel ....................... | 705/37 |
| 5,915,209 A * | 6/1999 | Lawrence ................... | 340/3.7 |
| 5,966,699 A * | 10/1999 | Zandi .......................... | 705/38 |
| 5,987,440 A | 11/1999 | O'Neil et al. | |
| 6,006,201 A * | 12/1999 | Berent et al. .................. | 705/27 |
| 6,009,412 A | 12/1999 | Storey | |
| 6,012,045 A | 1/2000 | Barzilai et al. | |
| 6,021,398 A | 2/2000 | Ausubel | |
| 6,023,685 A * | 2/2000 | Brett et al. .................... | 705/37 |
| 6,023,686 A | 2/2000 | Brown | |
| 6,026,383 A | 2/2000 | Ausubel | |
| 6,029,146 A | 2/2000 | Hawkins et al. | |
| 6,035,287 A * | 3/2000 | Stallaert et al. ............... | 705/37 |
| 6,044,363 A | 3/2000 | Mori et al. | |
| 6,055,518 A * | 4/2000 | Franklin et al. ............... | 705/37 |
| 6,058,379 A | 5/2000 | Odom et al. | |
| 6,085,169 A | 7/2000 | Walker et al. | |
| 6,085,176 A | 7/2000 | Woolston | |
| 6,108,639 A | 8/2000 | Walker et al. | |
| 6,115,698 A | 9/2000 | Tuck et al. | |
| 6,131,810 A | 10/2000 | Weiss | |
| 6,167,384 A | 12/2000 | Graff | |
| 6,167,386 A | 12/2000 | Brown | |
| 6,202,051 B1 * | 3/2001 | Woolston ..................... | 705/27 |
| 6,243,691 B1 * | 6/2001 | Fisher et al. .................. | 705/37 |
| 6,249,772 B1 | 6/2001 | Walker et al. | |
| 6,266,651 B1 * | 7/2001 | Woolston ..................... | 705/27 |
| 6,266,652 B1 | 7/2001 | Godin et al. | |
| 6,317,727 B1 | 11/2001 | May | |
| 6,324,538 B1 | 11/2001 | Wesinger, Jr. et al. | |
| 6,332,129 B1 | 12/2001 | Walker et al. | |
| 6,354,490 B1 | 3/2002 | Weiss et al. | |
| 6,356,878 B1 | 3/2002 | Walker et al. | |
| 6,415,264 B1 | 7/2002 | Walker et al. | |
| 6,415,269 B1 | 7/2002 | Dinwoodie | |
| 6,421,653 B1 | 7/2002 | May | |
| 6,449,601 B1 * | 9/2002 | Friedland et al. .............. | 705/37 |
| 6,560,580 B1 | 5/2003 | Fraser et al. | |
| 7,337,139 B1 | 2/2008 | Ausubel | |
| 2002/0035564 A1 | 3/2002 | Wesinger, Jr. et al. | |
| 2002/0080934 A1 * | 6/2002 | Katz ....................... | 379/93.02 |
| 2002/0082980 A1 | 6/2002 | Dinwoodie | |
| 2002/0091626 A1 * | 7/2002 | Johnson et al. ............... | 705/37 |
| 2002/0099651 A1 | 7/2002 | May | |
| 2003/0069753 A1 | 4/2003 | Brown | |
| 2003/0069817 A1 | 4/2003 | Graff | |
| 2003/0093360 A1 | 5/2003 | May | |
| 2003/0195839 A1 | 10/2003 | Dinwoodie | |
| 2003/0220868 A1 | 11/2003 | May | |
| 2003/0229571 A1 | 12/2003 | May | |
| 2004/0015430 A1 | 1/2004 | May | |
| 2004/0015431 A1 | 1/2004 | May | |

OTHER PUBLICATIONS

Noack, David. At your bidding; the old-fashioned auction goes high tech and on line. The Record. Aug. 26, 1996. p. 1-5.*
Landes, David, Letter from David Landes to Dan Veres (Aug. 16, 1996).*
Parity Reference Manual Version 1.22 (1993).*
Liederman, Erica. Java in the real world; Java is changing the way companies market products on the Internet. Java World. Mar. 1996. pp. 1-5.*
Muniauction, Inc. v. Thomson Corp., "Defendants' Notice of "prior Art" Pursuant to 35 U.S.C. §282".
U.S. Appl. No. 08/342,809, filed Nov. 21, 1994, Lawrence.
"Is an NC more than a PC?" *Network World*, 1997.
Copeland, Duncan G. et al. "Sabre: The Development of Information Based Competence and Execution of Information-Based Competition" (1995).
Leiner, Barry M. et al., "A Brief History of the Internet" (2003.
Zakon, Robert H., IETF RFC 2235, "Hobbes' Internet Timeline" (Nov. 1997).
Barrett, Bryan, Birth of the Internet.
"NCSA History: the 1990s," National Center for Supercomputing Applications (2002).
"Entrepreneur of the Year," Ernst & Young (2000).
Ruth, Heather, "PSA's Managing Information and Technology in the Municipal Bond Market" (1995).
"Home Many Online?" NUA (2004).
Internet Domain Survey, Jan. 2004, Internet Systems Construction, Inc. (2004).
Elliott, Elaine X., "A New Web Site Gives Agents an in on the Auction Craze" (Nov. 18, 1996).
Piou, Edward, "Open-Source Software and Software Patents" (Jul. 27, 1999).
"Amazon investor relations FAQ," Amazon.com.
"Auction Services Company Profile," Auction Services.
"Sources Guyides Energy Listing," Source Guides.
"Scout Report: Jun. 2, 1995," InterNIC (Jun. 1, 1995).
"Scout Report: Week Ending Oct. 14, 1994," InterNIC (Oct. 14, 1994).
"Scout Report: Week Ending Nov. 11, 1994," InterNIC (Nov. 11, 1994).
"Scout Report: Week Ending Nov. 18, 1994," InterNIC (Nov. 18, 1994).
"Scout Report: Week Ending Dec. 9, 1994," InterNIC (Dec. 9, 1994).
"Scout Report: Week Ending Jul. 1, 1994," InterNIC (Jul. 1, 1994).
"Scout Report: Week Ending Aug. 18, 1995," InterNIC (Aug. 18, 1995).

Rutkowski, Anthony-Michael, "The Present and the Future of the Internet" Five Faces (Jul. 27-29, 1994).
"USA Web Press Release," USA Web.com (May 7, 1999).
Bradner, S. "Why Now?" (1993).
Landes, David, Letter from David Landes to Dan Veres (Aug. 16, 1996).
Thomas, Rick, Letter from Rick Thomas to Dan Veres with enclosed pamphlet (Aug. 28, 1996).
Weber, Dr. Bruce W., "How Financial Markets are Going On-Line" (Oct. 1993).
Reiter, Michael K., "Distributing Trust with the Rampart Toolkit" (Apr. 1996).
Franklin, Mathew K. et al., "The Design and Implementation of a Secure Auction Service" (1995).
Frank, Maurice, DMBS Online, "Database and the Internet" (Dec. 1995).
Stein, Lincoln D., "How to Set Up and Maintain a World Wide Web Site—The Guide for Information Providers" (Aug. 1995).
Comer, Douglas E., "The Internet Book" (1997).
Stevens, W. Richard, "TCP/IP Illustrated, vol. 3: TCP for Transactions, HTTP, NNTP, and the Unix Domain Protocol," (Jan. 1996).
Tanenbaum, "Computer Networks" (1996).
Gralla, Preston, "How the Internet Work," (1996).
Reynolds, Kate, "Going, Going, Gone! A Survey of Auction Types" (1996).
Sutton, Marty et al., "Auctions—CMSC 691F-Electronic Commerc," (1999).
"Fundamentals of Municipal Bonds," Public Securities Association (1981).
"bond.pl" perl script filed with provisional application (May 22, 1997).
"TIC Calculation Code" filed with provisional application (May 29, 1997).
"Twenty-First Century Municipals, Inc. Business Plan," Twenty-First Century Municipals (Jul. 1995).
"New BidComp Capability Announcement" (Jan. 1995).
"New BondBidder Capability Announcement," Financial Systems Group, Inc. (Feb. 1995).
"Interface Between PARITY and BidComp".
Davis, Douglas D. et al., "Experimental Economics" (1993).
"Micro-Muni Bidding: Reference Manual, V.7.10," Financial Management Systems, Inc. (1992).
"Competitive Bidding Tutorial Using MicroMuni Bidding," Financial Management Systems, Inc. (1992).
"Business Plan—Edition #3", Twenty-First Century Municipals, Inc. (May 1996).
Parity v. 2.45, Twenty-First Century Municipals, Inc. (Feb. 1995).
BidComp v. 2.4, BidComp, (Feb. 1995).
Q-Bid, Q-Bid (Sep. 1991).
Bondbidder v. 5.2, BondBidder (Nov. 1994).
Screen captures from test Run of Q-Bid, Q-Bid (unknown).
Screen captures from a run of BondBidder, BondBidder (unkown).
Screen captures from a run of PARITY, Twenty-First Century Municipals (unknown).
Speech of Gerard Miller to the Government Finance Officer's Association, Gerard Miller (May 1996).
Text of Speect of Gerard Miller to the Government Finance Officer's Association, Gerard Miller (May 1996).
BidComp and PARITY Screen Dumps, BidComp/Parity (unknown).
"Citrix Announces Major Milestone for its Independent Computing Architecture (ICA)", Thin Planet (May 6, 1997).
"Sample Form of MuniBid Notice of Sale" (unknown).
"Introduction to MuniBid Optimizing Municipal Bond Sales" (unknown).
"BidComp Competitive Bidding System" (screen capture) (Jan. 15, 1998; Mar. 3, 1998).
"MuniBid: Optimizing Municipal Bond Sales" Brochure (unknown).
Parity . . . and the Municipal Securities Issuer, Unknown (unknown).
Parity Brochure (Parity: A Real-Time, No-Risk Bidding Network From 21st Century Municipals, Twenty-First Century Municipals (1992).
"Internet Benefits SF Redevelopment Offering", California Public Finance, v10, n. 21 (Jan. 13, 1997).

"In Today's Muni Market, Data Bases, Not Books, Provide", Nicholas J. Dazzo, The Bond Buyer, v289, #2821 (Aug. 29, 1989).
Dealers, clients With timely Bond Data: Municipal Bond Dealers have never had it so easy.
"JP Morgan and Capital Link in Bid to develop Electronic Auction for Corporation Debt Securities", Trading Systems Technology, c2, n20 (Apr. 24, 1989).
"Grant Street Advisors Is Setting Up the First Muni Bond Auction Web Site", The Bond Buyer, v320, #30159 (Jun. 14, 1997).
"Survey Shows Bond Market is Warning Up to Electronic Trading", Richard Richtmyer, The Bond Buyer, v321, #30213 (Aug. 20, 1997).
U.S. Trademark File History for mark "Parity & Design" (Reg. No. 1772571) including specimen entitled "Parity A Real-Time, No Risk Bidding Network From 21st Century Municipals", Twenty-First Century Municipals (1992).
"Electronic Bidding for Municipal Bonds: Technology Innovations for Competitive Bond Sales", Renata Morgenstern (Feb. 2000).
"Where is Dalcomp" New Product Awaits Inaugural Deal, Robert Whalen (Aug. 19, 1998).
"Dalcomp's Electronic Bidding System Set to Debut With Wisconsin GO Deal", Robert Whalen (Aug. 21, 1998).
Apr. 30, 1996 Fax, Parity (Apr. 30, 1996).
"Q: What Do These Issues Have in Commom", Unknown (unknown).
Official Notice of Sale, Tennessee Local Development Authority (unknown).
Bid Form, Tennessee Local Development Authority (unknown).
Parity Bid Form, Parity (unknown).
"Financial Advisors/Issuers", Unknown (unknown).
"Financial Advisors/Issuers" document, "Financial Advisors/Issuers see the following data for each bid and for each issue by dialing 206-635-0940 (this information only shows after the deadline for receipt of bids).", Unknown (unknown).
Parity Issue Viewer Program Screen Specs, Parity (undated).
90th Annual Conference, Portland, Oregon, Government Finance Officers Association (May 19-22, 1996).
An Analysis of Emerging Trends I the Securities Industry vol. XXII, No. 3, Securities Industry Association (Jul. 18, 1996).
America's Financial Markets—A Global Capital Pool vol. XXII, No. 4, ,Securities Industry Association (Aug. 30, 1996).
E-Mail Notices/Minutes from Worksheets Portion of Meetings, Charles Smith (Nov. 26, 1996).
Summary of TIC Calculations, BidComp (unknown).
E-mail re: Answer to some Bidcomp Questions, Cheryl Horowitz (Aug. 28, 1996).
E-mail re: BidComp Question, Jill Kirchheimer (Aug. 22, 1996).
E-mail re: Don Wise Meeting, Jill Kirchheimer (May 21, 1996).
E-mail re: BidComp, Jill Kirchheimer (Aug. 23, 1996).
E-mail re: BidComp Question, Jill Kirchheimer (Aug. 23, 1996).
E-mail re: BidComp Export, Jill Kirchheimer (Aug. 23, 1996).
List of Things We Want to Change, BidComp (undated).
Facsimile to Donald Wise re Bid Specifications, Angela Miceli (May 29, 1996).
Facsimile to Donald Wise re Bid Specifications, Cheryl Horowitz (Oct. 24, 1996).
The Bond Buyer's Competitive Post-Sale Worksheet—Jessieville School District No. 1 of Garland Country, Arkansas, The Bond Buyer (1996).
Muniview Search Software Requirements Specification, Unknown (Jul. 17, 1997).
Website printouts of TM Market Monitor Search printouts, Unknown (Feb. 3, 1998).
Newsroon Feed-Thomson Municipal Market Monitor (TM3) Functional Requirement, Thomson Municipal Group (1998).
BidComp 1992 Revenue Data, BidComp (1992).
Memo Regarding Bidcomp Revenue Monthly Accrual for November, Angela Miceli (Nov. 16, 1992).
PC BidComp Usage Tracking Report for 1992, BidComp (1992).
E-mail regarding Bidcomp Revenue Monthly Accrual for January, Angela Miceli (Jan. 21, 1992).
Summary Sheets for Glen 1-3 BidComp Summary Report, BidComp (unknown).

E-mail regarding BidComp Revenue Monthly Accrual for Aug., Angela Miceli (Aug. 21, 1992).
PC BidComp Usage Tracking Report for 1991, BidComp (1991).
E-mail regarding Bidcomp Revenue Monthly Accrual for October, Angela Miceli (Aug. 16, 1992).
PC BidComp Usage Tracking Report for 1991-1992, BidComp (1991).
BidComp Accounts Receivable Period Analysis, BidComp (Jul. 1993).
Parity Facsimile Return Sheet (Blank), Parity (Jun. 1, 1994).
Executive overview, 21st Century Municipals, Inc. (unknown).
The Bond Buyer's Competitive Presale Worksheet (various entities), The bond Buyer (1995).
Parity-Host Computer Operating Guide, Parity (undated).
Letter forwarding American Banker Bond Buyer Brochure, Joyce Smith (Aug. 28, 1991).
Customer Sales Journal, 21st Century Municipals (Jan. 1, 1994-Mar. 31, 1997).
MuniBid Survey of Dealers, MuniBid (Feb. 7, 1997).
Letter Forwarding proposal to develop the PC BidComp Software, Dr. Ernest Manuel, Jr. (Dec. 1, 1988).
Dalcomp and TM3: Integrated Technology Brochure, Thomson Financial Municipals Group (unknown).
Publications and Other Research Economic Policy Review, Federal Reserve Bank of New York (1995).
Parity Log On Screen Computer Instruction, 21st Century Municipals, Inc. (unknown).
Joint Marketing Agreement between 21st Century Municipals, Inc. and T.R. Nelson & Associates, Inc., 21st Century Municipals, Inc. (Nov. 10, 199 ).
Marketing Agreement between 21st Century Municipals, Inc. and Thomson Municipal Services, Inc., 21st Century Municipals, Inc. (Nov. 22, 1994).
License and Use Agreement between 21st Century Municipals and Integrated Financial Network, Inc., 21st Century Municipals, Inc. (May 10, 1996).
On-Line Services for the Fixed Income Markets, 21st Century Municipals, Inc. (Jul. 23, 1996).
Offering Memorandum, 21st Municipals, Inc. (Apr. 1, 1997).
Post-it Note regarding TF052668-74, Cheryl Horowitz (undated).
TMIS Competitive Package Business Plan, Cheryl Horowitz (Nov. 14, 1997).
Letter to Piper Jarray Inc. regarding Parity, 21st Municipals, Inc. (Dec. 31, 1992).
Letter from C. Horowitz to J. McCoy re: link between BidComp and Parity, Cheryl Horowitz (Mar. 19, 1998).
Additional comments from Financial Advisors and Issuers, Allen Williams and Cheryl Horowitz (Apr. 9, 1997).
TMG Marketing President's Report, Unknown (Mar. 1998).
Parity Technical Specifications, 21st Century Municipals, Inc. (1997).
Introduction to MuniBid Optimizing Municipal Bond Sales, Rich Thomas (undated).
Sample Form of Munibid Notice of Sale—Option 1: For Individual Maturity Bids Only, Rich Thomas (undated).
Form Agreement for Underwriters re: Implementation of Parity, 21st Century Municipals, Inc. (undated).
Telecommunications for Municipal Security Issuers, Advisors and Dealers, 21st Century Municipals, Inc. (undated).
In Today'Muni Market, Data Bases, Not Books, Provide Dealers, Clients with Timely Bond Data: Municipal Bond Dealers Have Never Had it so Easy, The Bond Buyer (Aug. 29, 1989).
JP Morgan and Capital Link in Bid to Develop electronic Auction for Corporate Debt Securities, Trading Systems Technology (Apr. 24, 1989).
Survey Shows Bond Market is Warming up to Electronic Trading, Richard Richtmyer (Aug. 20, 1987).
Parity: Current Customers and States, parity (Apr. 30, 1996).
Q&A of What do these issues have in common?, Parity (Jun. 6, 1995).
Official Notice of Sale Tennessee Local Development Authority, Unknown (May 10, 1996).
Suggested Language for Including in the Notice of Sale Regarding Parity, Unknown (unknown).

Citations from Newsletters, Business Week (1994).
A New Way to Manage Holiday Gift Returns; On Man's Gewgaw is Another's Treasure on Internet Auction Service, Business Wire (Dec. 27, 1996—submitted as several articles).
Thomson's Competitive Pre-Sale Worksheet, Thomson Market Information Services (1997).
Flyer regarding BidComp, BidComp (undated).
BidComp: Reliability and Support, Backed by the Integrity of The Bond Buyer, BidComp (undated).
Parity Screenshots: Running the Parity Program, Parity (undated).
Letter from D. Landes to Financial Advisors, parity (Oct. 26, 1994).
Technology Forum: Which Technologies Will Shape the Municipal Market?, Sarah Stirland (Aug. 14, 1996).
Reuters MuniMarket Services, Reuters MuniMarket Services (undated).
Utah Plans $265 Million Deal via Bloomberg, The Bond Buyer: Robert Whalen and Michael Marois (Jun. 2, 1998).
Results of Competitive Sales, The Bond Buyer (Sep. 30, 1998).
Bloomberg's "Virtual Road Show" Helps IPA Bury the Old Dog & Pony, The Bond Buyer: Robert Whalen (Sep. 9, 1998).
DalComp Purchases Parity-Release, Cheryl A. Horowitz (Jan. 5, 1998).
How to Use Parity on Your Next Sale, Parity (Jan. 23, 1998).
Integrated Technology for today's Competitive Sale Market (brochure), Thomson Municipal Group (undated).
Integrated Technology to Today's Competitive Sale Market (Draft), Thomson Municipal Group (undated).
Competitive issues for School District of Upper Dublin (Pennsylvania), Unknown (Jun. 15, 1995).
Dalcomp: A Thomson Financial Services Company (brochure), Dalcomp (undated).
Special Survey on the Future of Electronic Bond Trading Systems, The Bond Market Association (Oct. 1997).
"Broker-Dealers to Hawk Productions via Satellite and Cable TV", The Bond Buyer: Sarah Stirland (Apr. 16, 1997).
21st Century Municipals, Inc./BondsOnline Web Stats, 21st Century Municipals (Jul. 22, 1996).
Parity and MuniBid: Buy the Bonds You Want!, 21st Century Municipals (undated).
21st Century Municipals Customer Sales Journal, 21st Century Municipals (Mar. 28, 1997).
Parity Activity, 21st Century Municipals (undated).
Bond Activity, 21st Century Municipals (undated).
Broker-Dealers to Hawk Products via Satellite and Cable TV, The Bond Buyer: Sarah Stirland (Apr. 16, 1997).
Electronic Auction Logs 110,000th Winning Bid, Business Wire (Nov. 26, 1996).
City First in Nation to Use Internet to Market, Sell Municipal Bonds, Johanna Pro (Nov. 19, 1997).
Competitive Bid New Issue for City of Pittsburgh, Grant Street Advisors (Nov. 22, 1996).
Competitive Bidding for Municipal Bonds is Coming to the World Wide Web, The Bond Buyer: Richard Richmeyer (Jun. 4, 1997).
Deal Analysis, Thomson Municipal Market Monitor, Thomson Municipal Monitor (2001).
E-mail from Sarah Thomas to Myles Harrington and Dan Veres re: '219 Patent, Sarah Thomas (Jan. 13, 1999).
E-mail from Sarah Thomas to Myles Harrington and Dan Veres re: '896 Patent, Sarah Thomas (Jan. 13, 1999).
Expedia: Screen Shot, Expedia.com (1997).
BidComp Command Card, Angela Miceli (Mar. 7, 1996).
Notes re BidComp/DalComp, Unknown (unknown).
Parity Reference Manuals and Screen Shots, parity (various 1992).
MuniAuction Takes Show on the Road, Pitches Case to Potential Customers, Jodi B. Cohen (Feb. 17, 1998).
Offering Memorandum, 21st Century Municipals (Apr. 1, 1997).
Panelists Extol the Many Benefits of Widespread Internet-Based Trading, The Bond Buyer: Robert Whaln (Mar. 16, 1998).
Parity (v.2.0) Screen Shots and Information Manual, Parity (1994).
Participants See the Market Playing a Good Game of Catch-Up, The bond Buyer: Robert Whalen (Apr. 8, 1998).
Piedmont Software Company, The Bond Swap Series, Piedmont Software Company (undated).

Proposal to Purchase for City of Pittsburgh, City of Pittsburgh (Dec. 3, 1996).
Proposed Structure of Joint Venture Between FSG and ABBB, Unknown (Dec. 3, 1991).
Response from Patent Office on Harrington Application, Patent office (Sep. 9, 1990.
Screen Shot of Bid Ohio, State of Ohio (1999-2001).
How to Use Parity on Your Side, Parity (unknown).
Thomson On-Line Worksheets Phase One, Thomson Financial Services (unknown).
Thomson Pre-Sale Worksheet Printed Report, Thomson Financial Services (unknown).
Thomson Post-Sale Worksheet Printed Report, Thomson Financial Services (unknown).
Thomson Competitive and Negotiated Brief Printed Reports, Thomson Financial Services (unknown).
Thomson Pre-Sale Worksheets On-Line Presentation (Draft 1.0), Thomson Financial Services (unknown).
Thomson Post-Sale Worksheets Online Presentation (Draft 1.0), Thomson Financial Services (unknown).
Thomson Negotiated and Competitive Briefs On-Line Presentation (Draft 1.0) Thomson Financial Services (unknown).
Thomson Deal Analyses, Thomson Municipal Market Monitor (various).
Trademark Application for parity, 21$^{st}$ century Municipals (May 18, 1993).
Parity Form of Agreement, David Landes (Feb. 6, 1995).
Agreement between Parity and Seattle First National Bank, David V. Landes (Aug. 25, 1992).
Agreement between Parity and Norwest Investment Services, Inc., David V. Landes (Feb. 9, 1994).
Agreement between Parity and Kirkpatrick, Pettis, Smith, Polian Inc., David V. Landes (Jan. 19, 1993).
Agreement between Parity and T.R. Nelson & Associates, Inc., Terry R. Nelson (Nov. 10, 1993).
Agreement between Parity and Integrated Financial Network, Inc., David V. Landes (May 20, 1996).
Notice of Termination between Parity and Integrated Financial Network, Inc., David V. Landes (Feb. 10, 1997).
Agreement between Parity and A.G. Edwards & Sons, Inc., David V. Landes (Apr. 12, 1995).
Agreement between Parity and A.G. Edwards & Sons, Inc., David V. Landes (Jun. 7, 1993).
Agreement between Parity and ABN AMRO Securities (USA) Inc., David V. Landes (Jul. 28, 1995).
Agreement between Parity and William R. Hough & Co., David V. Landes (Nov. 29, 1995).
Agreement between Parity and US Bank of Washington, N.A., David V. Landes (Apr. 7, 1994).
Agreement between Parity and Fidelty Capital Markets, David V. Landes (Oct. 26, 1994).
Agreement between Parity and Paine Webber, Inc., David V. Landes (Oct. 15, 1995).
Agreement between Parity and Goldman, Sachs & Co., David V. Landes (Feb. 28, 1996).
Agreement between Parity and Griffin, Kubik, Stephens & Thompson, Inc., David V. Landes (Jun. 18, 2003).
Agreement between Parity and Clayton Brown & Associates, Inc., David V. Landes (Jul. 7, 1993).
Agreement between Parity and Everen Securities, Inc., David V. Landes (Aug. 8, 1995).
Agreement between Parity and Smith Barney, Inc., David V. Landes (Apr. 29, 1996).
Agreement between Parity and Smith Barney, Inc., David V. Landes (Aug. 11, 1994).
Agreement between Parity and Piper Jaffray Inc., David V. Landes (Aug. 31, 1992).
Agreement between Parity and Lehman Brothers, Inc., David V. Landes (Feb. 13, 1995).
Agreement between Parity and Prudential Securities, Incorporated, David V. Landes (Nov. 10, 1995).
Agreement between Parity and J.P. Morgan Securities, Inc. with Amendment No. 1, David V. Landes (May 24, 1995, Mar. 1, 1995).
Agreement between Parity and Dillon, Read & co. Inc. David V. Landes (Mar. 22, 1995).
Agreement between Parity and Russ Jansky BVP, David V. Landes (unknown).
Agreement between Parity and Mesirow Financial Inc., David V. Landes (Jul. 1, 1993).
Automated Trading & Straight Through Processing, Robert Whalen, The Bond Buyer (Aug. 31, 1998).
Bloomberg Offers Free Electronic Municipal Underwriting Service, PR Newswire (Aug. 21, 1998).
Electronic Bidding: Rare Competitive Sale by Florida Hospital Could Spark Trend, Robert Whalen, The Bond Buyer (Jul. 29, 1998).
Electronic Offering: Wave of the Future of Fad of the Present, Robert Whalen, The Bond Buyer (Jul. 15, 1998).
Accounting Systems and Information Services, Robert Whalen, The Bond Buyer (Jul. 13, 1998).
Competition Rise to be Lead Muni Technology Provider, Robert Whalen, The Bond Buyer (Jul. 8, 1998).
Bloomberg's Electronic Biddong Platform is Successfully Used for Utah GO Sale, Robert Whalen, The Bond Buyer (Jun. 17, 1998).
From Elsewhere, California Public Finance (Jun. 8, 1998).
Utah's Treasurer Striding to Stay in Step with the Speed of Technology, Robert Whalen, The Bond Buyer (Jun. 3, 1998).
Bloomberg Sees Its Entry onto Bidding Playing Field as "Natural Extension", Robert Whalen and Michael B. Marois, The Bond Buyer (Jun. 3, 1998).
Utah Plans $265 Million Deal Via Bloomberg, Robert Whalen and Michael B. Marois, The Bond Buyer (Jun. 2, 1998).
Utah to Hold $265 Million Competitive Bond Sale over Bloomberg; Electronic Sale a first both the State and Bloomberg, PR Newswire (Jun. 1, 1998).
Electronic Bidding Through Parity and MuniBid, The Bond Buyer (Aug. 21, 1996).
Bonds Finish Up; Competitive Deals by Wisconsin and Others Feed Market, Katie O'Donnell, The Bond Buyer (Jan. 19, 1995).
Email from Veres to Chiappetta: Parity Pricing Follow-Up, Dan Veres (Sep. 8, 2000).
Stirland, Sarah, "Wall Street Is Rattled by Software That Can Remake Competitive Deals," The Bond Buyer (Aug. 21, 1996).
Parity Reference manual, Version 2.7.
BidComp brochure, When you've been on the underwriting desk as long as we have—you've got to be better than good. (1990).
Running the Parity program, pp. 1-14.
Thomas, Rick, President MuniBid Inc., "Wall Street Players Shouldn't Block New Bidding Technology," The Bond Buyer (Oct. 21, 1996).
Whalen, Robert, "Pittsburgh Will Be First Issuer To Auction Bonds On The Web Maturity By Maturity," The Bond Buyer (Nov. 13, 1997).
Cohen Jodi B., "Muni Auction Takes Show on the Road, Pitches Case to Potential Customers," The Bond Buyer (Feb. 17, 1998).
Cullen, Terri, "Internet Auction Site for Muni Bonds Could Spark Changes in Credit Markets," The Wall Street Journal (Mar. 16, 1998).
Shields, Yvette, "Panelists at Odds Over Internet's Maturity Bidding," The Bond Buyer (May 22, 1998).
Letter from Peter K. Trzyna, Esq. dated Feb. 21, 2001.
Letter from Peter K. Trzyna, Esq. dated Mar. 1, 1999.
Grant Street Group Products & Services, http://www.grantstreet.com/information/products.html. 2 pages, copyright 1997-2001.
Grant Street Group Information, http://www.grantstreet.com/information/, 3 pages, copyright 1997-2001.
Hershey Jr., Robert D., "Trading In Bonds On Line, At Last," The New York Times (Jun. 27, 1999).
Pro, Johnna, City first in nation to use Internet to market, sell municipal bonds, Pittsburgh Post-Gazette (Nov. 19, 1997).
"Municipals Sales & Trading," A collection of Bloomberg Magazine Articles.
A Review of Electronic Trading System in the U.S. Fixed Income Securities Markets, The Bond Market Association (Oct. 1997).
Dalcomp brochure, "A Thomson Financial Services Company".
Press release, "Dalcomp Purchases Parity" (Jan. 5, 1998).
Thomson Municipal Group brochure, "Integrated Technology".

http://www.BidOhio.com, Introduction, Internet materials (Jan. 8, 2001).
Richtmyer, Richard, "Muni Players Leery of Grant Street's Foray Into On-Line Bidding," The Bond Buyer, Jun. 11, 1997.
Whalen, Robert, "Pittsburgh Uses Internet For Pioneering GO Sale," The Bond Buyer (Nov. 19, 1997).
Whalen, Robert, "Pittsburgh Returns to Internet With $257 Million Pension Deal," The Bond Buyer (Feb. 4, 1998).
Whalen, Robert, Pittsburgh Pension Deal Blazes Maturity-By-Maturity Trail, The Bond Buyer (Feb. 5, 1998).
Notice of Sale, $167,440,000 City of Pittsburgh, Pennsylvania, General Obligation Refunding Bonds, Series A of 1996.
Clark, Kim, "On the Frontier of Creative Finance: How Wall Street Can Securitize Anything," Fortune (Apr. 28, 1997).
Bencivenga, Dominic, Pioneer Deal Uses Copyright to Raise Capital, The New York Law Journal (May 15, 1997.
Extracts from Videotape Deposition of Daniel Veres, pp. 102-109 (Mar. 20, 2003).
Marketing Agreement (Nov. 22, 1994), TF 002557—TF 002569.
Securities and Exchange Commission, 17 CFR Parts 200, 228, 229, 230, 232, 239, 240, 270 and 274, "Use of Electronic Media for Delivery Purposes," (May 9, 1996), TF 005698-TF 005723.
Securities and Exchange Commission, 17 CFR Parts 228, 229, 230, 232, 239, 240, 249, 250, 259, 260, 269 and 274, "Rulemaking for Edgar System," (Dec. 19, 1994), TF 005724-TF 005794.
Securities and Exchange Commission, 17 CFR Part 240, "Municipal Securities Disclosure," TF 005795-TF 005851 (Nov. 10, 1994).
"Competitive Bond Offerings," (Oct. 8, 1997) TF 005942.
"There's a new standard calculations," TIPS, Summit NJ, (Jan. 1996), TF 012027-TF 012047.
Parity, "Running the Parity program," (1997 Twenty First Century Municipals, Inc.), TF 012406-TF 012421.
Parity, "A Real-Time, No-Risk Bidding Networking From 21$^{st}$ Century Municipals," (1992), TF 012542-TF 012546.
Bondbidder, "User's Guide Version 4.2," Financial Systems Group, Inc., Matthews, NC, TF 012645-TF 012645-TF 012645-TF 012691.
Marketing Agreement, (Nov. 22, 1994), TF 0012750—TF 012758.
Service Mark Application—Principal Register Based on Intent to Use, Mark: Parity and Design, (Mar. 25, 1992), TF 012759-TF 012761.
Trademark Interview and Amendment Record, (Jun. 4, 1992), TF 012764-TF 012766.
Notice of Acceptance of Statement of Use, Mark: Parity, (Feb. 26, 1993), TF 012768.
Certificate of Registration No. 1772581, (May 18, 1993), TF 012771-TF 012772.
21$^{st}$ Century Municipals, Inc., "Customer Invoice Analysis" Jan. 1, 1996 to Dec. 31, 1996, (Apr. 14, 1997), TF 012773.
Brochure, MuniBid, "Optimizing Bond Sales for the Tax-Exempt Issuer, " TF 012795-TF 012796.
Resnick, Amy B., "Parity On-Line Bidding Program Wins Positive Reviews," TF 012797.
Parity bidding system, TF 012813-TF 012818.
Schory, Brenda, Kane County Chronicle, "Electronic Bid Option," TF 012819, TF013802 (May 27, 1993).
Parity Reference Manual, Version 1.22, (1993), TF 012820-TF 012820-TF 012852.
Bond Buyer Correspondence (1994), TF 012854-TF 012857.
"The Electronic Bid Submission System," TF 012858-TF 012866.
Jul. 9, 1993 Letter to Dalcomp from The Bond Buyer.
Jun. 14, 1993 fax to American Banker-Bond Buyer, TF012871-TF012872.
Notes, TF 012873-TF 012877.
Bond Buyer Memo, (Dec. 4, 1992), TF 112878.
Bond Buyer Marketing Plan and correspondence, (Jul. 7, 1992), TF 012881-TF 012883.
Notes, (1993),TF 012884-TF012896.
Oct. 13, 1994 memo from Davis Landes, TF 012906-TF 012908.
Oct. 27 notes, TF 012921-TF 012923.
Nov. 1994 notes, TF 012925-TF 012933.
Parity Bid Form, (1995), TF 012934-TF 012937.
Parity, "Product Description," TF 012940-TF 012944.
Deal Analysis Sheets, (1997), TF 013082-TF 013255.
Deal Analysis Sheets, (1996), TF 013261-TF 013634.
Audio Tape, GFOA 1996 Conference, Tuesday Morning General Session, "Technologies Beyond the Finance Office," C. Toregas, et al., TF054432.
Audio Tape, GFOA 1996 Conference, Opening General Session, T. Riordan; Mayor V. Kata, President's Address; Keynote—J. Connors, TF054433.
Audio Tape, GFOA 1996 Conference, "Reengineering the Finance Office," K. Keith, et al., TF 054434.
Audio Tape, GFOA 1996 Conference, "Offering Debt Information on the Internet," A. Anders, et al., TF 054435.
Audio Tape, GFOA 1996 Conference, "www Home Pages for Governments," B. Redlin et al., TF 054436.
Audio Tape, GFOA 1996 Conference, "Debt Affordability Analysis, A Comparative Approach," T. Firestone, et al., TF 054437.
Parity, "Host Computer Operating Guide," TF 01365-TF 013650.
Fax from Landes to Dalcomp, BidComp Summary Report, TF 013651-TF013652.
Parity, "Issue Viewer Program Screen Specs," TF 013653-TF 013670.
"Task Description and Notes," (Apr. 10, 1998), TF 013671-TF 013687.
"Calendar of Parity issues" and other formats (1998), TF 013688-TF 013694.
Press Release, "Wis. electronic bid test passes without a hitch" (Sep. 15, 1998), TF 013703-TF 013704.
Whalen, Robert, The Bond Buyer, "No Fuss, No Muss for Wisconsin Deal, And Morgan Stanley Wins the Bid," (Sep. 16, 1998), TF 013705-TF 013707.
MuniBid brochure, "Optimizing Bond Sales for the Tax-Exempt Issuer," TF 013708-TF 013709.
BidComp disk, TF -13710.
The Bond Buyer's Worksheets, BidComp, TF 013711—TF 013714.
The Bond Swap Series, Piedmont Software Company, Charlotte, NC, TF 013715—TF 013728.
Parity, Reference Manual, Version 1.22 (Sep. 1, 1992), TF 013775-TF 013801.
"Instructions for Accessing Issuer Program" (Parity 1992-1994), TF 013805—TF 013813.
"Host Computer Operating Guide," TF 013814-TF 013823.
Parity, "Running the Parity program," TF 013829-TF 013843 (Parity 1993-1995).
"Now, All The Power of BidComp Can Fit in Your PC," TF 013944-TF 013946.
FSG, "System Descriptions," Financial Systems Group, Inc., Matthews, NC, TF 014000-TF 014008.
FSG, Financial Systems Group, Inc., TF 014009-TF 014013.
Parity, "Reference Manual, Version 2.7," TF 014016-TF 014051.
Government Finance Officers Association, "Technology and Public Finance, 90$^{th}$ Annual Conference, Portland, Oregon," (May 19-22, 1996), TF 054143-TF 054187.
Article, "Fax Your Bid to Brevard".
"Bid Submission Confirmation" (Jul. 21, 1992).
"Bidcomp Screen," "Parity Bid Entry Screen," text TF 002565.
Brochure: "It's the SIA/PSA Standard Securities Calculations Software Library. Produced by TIPS." TF 012033, 012035.
Add.
"Bondbidder User's Guide, Version 4.2," Financial Systems Group, Inc., TF 012645-TF 012691.
Citations TF 050079-TF 050145 (printed Oct. 1, 2001).
RetroSearch, Sep. 13, 2001 TF 050146-TF 050150.
Citations TF 050151-TF050179 (printed Oct. 1, 2001).
Citations TF 050180-TF050185 (printed Sep. 13, 2001).
Citations TF 050186-TF 050338 (Printed Sep. 13, 2001).
Citations TF 050339-TF 050501 (Printed Oct. 2, 2001).
Citations TF 050502-TF 050530 (Printed Feb. 6, 2002).
Citations TF 050531-TF 050534 (Printed Feb. 6, 2002).
Citations TF 050535-TF 050706 (Printed Feb. 6, 2002).
Citations TF 050707-TF 050770 (Printed Feb. 6, 2002).
Citations TF 050771-TF 050775 (Printed Oct. 2, 2001).
Citations TF 050776-TF 050780 (Printed Oct. 2, 2001).
Citations TF 050781-TF 050787 (Printed Oct. 2, 2001).
Citations TF 050788-TF 050864 (Printed Oct. 2, 2001).

Citations: TF 054133-TF 954135 (Printed Apr. 18, 2002).
Bureau of the Public Debt online, "Public Debt's Strategic Plan 1997-2001" TF 050950-TF 050962, TF 050867-TF 050879.
Government Finance Officers Association—GFOA.ORG, TF 050963-TF 050987 (Copyright 2002).
Yahoo Premium Document Search, Search results, TF 050988-TF 051013 (Printed Feb. 6, 2002).
"Bidding Wars" TF 051014-TF 051016 (Oct. 10, 1997).
"Poway set to auction land in industrial part. (South Poway Business Park)," San Diego Business Journal, TF 051017-TF 051018 (Jul. 3, 1995).
Edwards, Cheryl L., "Open Market Operations in the 1990s," Federal Reserve Bulletin, pp. 859-874, TF 051045-TF 051060 (Nov. 1997).
"Onsale Brings Thrill of Auctions and Bargain Hunting Online; Unique Internet retail service debuts with week-long charity auction for The Computer Museum in Boston," TF 051625-TF 051627 (May 24, 1995).
Siegmann, "Nowhere to go but up," PC Week, v. 12, n. 42, TF 051628-TF 051630 (Oct. 23, 1995).
"Internet Booms—Onsale joins fray as online shopping picks up speed," Computer Reseller News, p. 73 TF 051631, 051632 (Jun. 5, 1995).
Federal Reserve Bank of New York Research and Market Analysis Group, "Publications & Other Research 1997," TF 051779-TF 051822.
Bartolini, L. and Cottarelli, C., "Designing Effective Auctions for Treasury Securities," Federal Reserve Bank of New York Current Issues In Economics and Finance, vol. 3, No. 9, TF 051817-TF 051822, TF 050003-TF 050073 (Jul. 1997).
Federal Reserve Bank of New York Research and Market Analysis Group, "Publications & Other Research 1995," TF 051826-TF 051863.
Reinhart, V., "An Analysis of Potential Treasury Auction Techniques," Federal Reserve Bulletin (Jun. 1992) TF 051893-TF 051903.
Mester, Loretta J., "There's More than One Way to Sell a Security: The Treasury's Auction Experiment," Business Review (Jul./Aug. 1995) TF 051906-TF 051920.
Friedman, Milton, "How to Sell Government Securities," The Wall Street Journal, p. A8 (Aug. 28, 1991), TF 051921-TF 051923.
Stevens, E.J. and Dumitru, Diana, "Auctioning Treasury Securities," Economic Commentary Federal Reserve Bank of Cleveland (Jun. 15, 1992) TF 051924-TF 051927.
Brochure, "The Finance Officer and The Communities of Tomorrow," Conference dates: Jun. 1-4, 1997, Exhibit dates: Jun. 1-3, 1997, Application/Contract for Exhibit Space, Registration Form, TF 051928-TF 051935.
Preliminary Conference Program, "The Finance Officer and The Communities of Tomorrow," 91st Annual Conference, Jun. 1-4, 1997, TF 051937-TF 051952.
"Joint Report on the Government Securities Market," TF 051953-TF 051953-TF 052148 (Jan. 1992).
Miller, Preston J. and Roberds, William, "How Little We Know About Deficit Policy Effects," Federal Reserve Bank of Minneapolis Quarterly Review Winter 1992, TF 052149-TF 052168.
Umlauf, Steven R., "An empirical study of the Mexican Treasury bill auction," Journal of Financial Economics 33 (1993) 313-340. North-Holland, TF 052169-TF 052196 (1993).
Brochure, "Integrated Technology," Thomson Municipal Group, TF 002702-TF 002706.
White, Wilson, "Basics, The Municipal Bond Market," TF 006782-TF-007043 (1985).
Fundamentals of Municipal Bonds, Fourth Edition, Public Securities Association, TF 007044-TF 007280 (1990).
Glossary of Municipal Securities Terms, First Edition: 1985 Municipal Securities Rulemaking Board, TF 007281-TF 007396.
Security Industry Trends, An Analysis of Emerging Trends in the Securities Industry, vol. XXII, No. 4, "America's Financial Market—A Global Capital Pool," TF 010721-TF 010732 (Aug. 30, 1996).
Security Industry Trends, An Analysis of Emerging Trends in the Securities Industry, vol. XXII, No. 3, "Securities Industry Performance: 1H96," TF 010734-TF 010764 (Jul. 18, 1996).

Whalen, Robert, "News and Trends: Market Keen on Dalcomp acquisition, Expanded Platform for Internet Deals," The Bond Buyer, TF 012295-TF 012297 (Mar. 4, 1998).
Ulick, Jake, "Strong Demand For New Deals Uplifts Munis, Slashes Yields," The Bond Buyer, TF 012298-TF 012299 (Feb. 4, 1998).
Prospero, L., "Munis Unchanged As Busy New-Issue Session Begins," Dow Jones Newswires, TF 012300 (Feb. 3, 1998).
Prospero, L., "Munis -2: Pittsburgh To Sell $257M Bonds Via Internet," Dow Jones Newswires, TF 012301- TF 012302 (Feb. 2, 1998).
Rannazzisi, J., "Munis End Flat As New Issues Worth $2 Billion Are Well Received," The Bond Buyer, TF 012303—TF 012304 (Nov. 19, 1997).
Richtmyer, R., "News and Trends: Muni Players Leery of Grant Street's Foray Into On-Line Bidding," The Bond Buyer, TF 012305-TF 012307 (Jun. 11, 1997).
Richtmyer, R., "Grant Street Advisers is Setting Up The First Muni Bond Auction Web Site," The Bond Buyer, TF 012308-TF 012309.
Richtmyer, Richard, "Gaining Parity: Dalcomp Purchases Electronic Bid System to Exploit Internet," The Digest, vol. 323, No. 30338, TF 012395-TF 012396 (Feb. 25, 1998).
Brochure, "MuniBid, Optimizing Bond Sales for the Tax Exempt Issuer," TF 012795-TF 012796.
Brochure, "Bidcomp: Reliability and support, backed by the integrity of The Bond Buyer," TF 013947-TF 013948.
"The 1998 Review of Electronic Transaction Systems in the U.S. Fixed Income Securities Markets," TF 049957-TF 049983 (Nov. 1998).
"The Bureau of the Public Debt, Strategic and Operational Plan 1997-2001," TF 049984-TF 049999.
"1996 Survey on the Use of the Internet and Other On-Line Services by Public Finance Officials," BMIA, Government Finance Officers Assn., TF 050865-TF 050866, TF 054320-TF 054324.
Bureau of the Public Debt online, Public Debt's Strategic Plan 1997-1002, TF 050879 (Updated May 20, 1999).
Cammack, Elizabeth B., "Evidence on Bidding Strategies and the Information in Treasury Bill Auctions," Journal Of Political Economy, TF 052197-TF 052227.
Schmerken, Ivy, "Cleansing The Treasury Auction,", Wall Street Computer Review, vol. 9, No. 2, 29, TF 053206-TF 053210, TF 054138-TF 054142.
McCright, John S., "Auctioning off the Internet, Delphi, Museum to sell wares on web," TF 053211, TF 054136-TF 054137.
K.C.; Harlan, Megan, Reviews, "The Week" Entertainment Weekly, May 2, 1997 Issue 377, p. 64 TF 053212-TF 053214.
Gordon, Maynard M., "Auctions become high tech. (auto auctions)," Dealer Business, vol. 29, No. 7, p. 21, TF 053215-TF 053217(Mar. 1995).
Mardesich, Jodi, "Onsale takes auction gavel electronic; site offers clearance for end-of-life products," Computer Reseller News, No. 691, p. 2.TF 053218-TF 053220 (Jul. 8, 1996).
Elliott, Elaine X., "A New Web Site Gives Agents An In on the Auction Craze," Travel Agent, TF 053221-TF 053224 (Nov. 18, 1996).
Cyberguide: Learning Lab + Marketplace, Netguide, vol. 2, No. 8 (Aug. 1995) TF 053345-TF 053349.
"Online Auction House Finds Growth With Second-Hand Technology," Webweek, vol. Two, Issue Eight, TF 053392-TF 053397 (Jun. 17, 1996).
Ravindran, S. et al., "Strategies for Smart Shopping in Cyberspace," Journal of Organizational Computing and Electronic Commerce 6(1), 33-49, TF 053398-TF 053398-TF 053406 (1996).
Cheng, Kipp, "On-the-block party; A celeb auction in cyberspace," Entertainment Weekly, YF 053427(May 2, 1997).
Eng, Paul M., "Auctioning Off Relics Of The Computer Age," Business Week Online, TF 053407 (Apr. 11, 1994).
Eng, Paul M., "Window-Shopping Will Never Be The Same," Business Week Online, TF 053408 (Apr. 11, 1994).
Citations: TF053409 (printed Oct. 2, 2001).
Lu, Stacy, "Taking In the Sites; Web's On-Line Auctions Are a Browser's Delight," The New York Times, TF 953410-TF 053412 (Dec. 30, 1996).

Bryant, Adam, "Am I Bid Six? Click to Bid Six!; Airlines Are the Latest to Move to On-Line Auctions," The New York Times, TF 053413-TF 053416 (May 13, 1996).

Lewis, Peter H., "Company News; Auction of Collectibles on the Internet," The New York Times, TF 053417-TF 053418 (May 23, 1995).

Plotkin, Hal, "Art Net," Forbes, TF 053419-TF 053422 (Apr. 6, 1998).

Flanagan, William G. et al., "Auctions on the Internet?" Forbes, TF 053423-TF 053424 (Dec. 18, 1995).

"Executive Travel; Business Travel Notes," Los Angeles Times, TF 053425-TF 053426 (Sep. 28, 1995).

"On-line auctions: Going, going . . .," The Economist, TF 053428-TF 053429 (May 31, 1997).

Wilder, Clinton, "Sold! On the Web—Internet Shopping Network's First Auction hopes to out-earn its parent," Information Week, TF 053430-TF 053431 (Jun. 16, 1997).

Tomkins, Richard, "Passengers take a seat at the Internet auction: Richart Tomkins on airlines' ventures into cyberspace in their quest to fill unused capacity," Financial Times (London), TF 053432-TF 053433 (Jun. 17, 1996).

Copulsky, Erica, "Art dealers eye Internet as auction mechanism; Cantor Fitzgerald said to be looking seriously," Investment Dealers' Digest, TF 053434-TF 053435 (Nov. 11, 1996).

Smith, Laura B., "Going . . . gone; auctions on the Web; includes a related article on RFPs on the Web; PC Week Executive; Internet/Web/Online Service Information," PC Week, TF 053436-TF 053440 (Aug. 26, 1996).

Business Wire, "eBay's AuctionWeb: A New Way to Manage Holiday Gift Returns; One Man's Gewgaw id Another's Treasure on Internet Auction Service," TF 053478, 053487 (Dec. 27, 1996).

Business Wire, eBay's AuctionWeb Tops One Million Bids; Leading Online Auction Service Announces Record Year (Dec. 12, 1996) TF 053478-TF 053479, 053487-88.

PR Newswire, "Bonsai Software Introduces the EasyAuction ™ Internet Auction Service," TF 053480, 053489 (Dec. 11, 1996).

PR Newswire, "Bonsai Software Unveils Fourth Internet Auction," TF 053481, 053490 (Nov. 11, 1996).

Business Wire, "Internet Retailer Onsale Successfully Sells $12,000 Mainframe in Online Auction Over the World Wide Web," TF 053482, 053491 (Nov. 15, 1996).

"Online auction site building strength," *Computer Retail Week*, p. 51, 053483, 053493 (Dec. 2, 1996).

O'Connell, D., "Aer Lingus holding auction of airline seats on Internet," Travel Trade Gazette UK & Ireland, p. 15, TF 053484, 053493 (Nov. 6, 1996).

PR Newswire, "Aer Lingus Internet Auction—Update," TF 053484-TF 053485, 053453-54 (Aug. 12, 1996).

PR Newswire, "Aer Lingus Launches Cyber-Values on the Internet; Irish Airline is First European Carrier to Offer Seat Facility," TF 053485-TF 053486, 053494-95 (Aug. 1, 1996).

Lee, Ho Geun & Clark, Theodore H., "Impacts of the Electronic Marketplace on Transaction Cost and Market Structure," International Journal of Electronic Commerce/Fall 1996, vol. 1, No. 1, pp. 127-149, TF 053496-TF053518 (1996).

Rockoff, Todd E. and Groves, Michael, "Design of an Internet-based system for remote Dutch auctions," Internet Research: Electronic Networking Applications and Policy, vol. 5, No. 4, pp. 10-16, TF 053519-053525 (1995).

"Made in Texas: Global Exports Boost State Economy," The Southwest Economy, Issue 5—1995, Federal Reserve Bank of Dallas, TF 053526-TF 053537 (1995).

"Canadian Economy," Government of Canada Securities, A Publication of the Department of Finance, TF 053538-TF 053538-TF 053541 (Jun. 1997).

Secondary Market, Government of Canada Securities, A Publication of the Department of Finance, TF 053542-TF 053543.

Dictionary of Computer Words, pp. 134-135, 142-143, 194-195, 302-303, TF 053544-TF 053549(1995).

"The Finance Officer and The Communities of Tommorow," 91st Annual Conference, Jun. 1-4, 1997, TF 054188-TF 0542325.

Government Finance Officers Association, "Performance, 89th Annual Conference," TF 054233-TF 054273 (Jun. 11-14, 1995).

Government Finance Officers Association, "Exploring the Boundaries of Government Finance," 88th Annual Conference, TF 054274-TF 054314 (Jun. 5-8, 1994).

Zorn, Paul, "Use of On-Line Technology: A GFOA/MBIA Survey," Government Finance Review, pp. 28-30, TF 054315-TF 054317 (Aug. 1996).

GFOA Newsletter, GFOA Product Corner, pp. 2-3, TF 054318-TF 054319 (Jun. 14, 1996).

Government Finance Officers Association 90th Annual Conference, Portland, Oregon, Audio/Video Tape Listing Order Form, TF 054325-TF 054328 (May 18-22, 1996).

Underwood, Chris, "A Multiple Round Ascending Auction Process Suitable for the Disposal of Spectrum in New Zealand," TF 054700-TF 054705 (Jan. 17, 1996).

Gribik, Paul, "*27Learning From California's QF Auction," Public Utility Fortnightly, vol. 133, No. 8, TF 054706-TF 054711 (Aug. 15, 1995).

La Roche, Elaine, "Bandwidth, Risk and Real Time: Cyberfinance in the 21st Century," The Bond Market Association, ID 04-02671-ID 04-02676 (Apr. 26, 1996).

Meehan, John J., Globalization and Technology at Work in the Bond Markets, The Bond Market Association, ID 04-02677-ID 04-02681 (Mar. 1, 1997).

Ruth, Heather L., "Extracting Business Value From Technology Investments in the Bond Business," The Bond Market Association, ID 04-02682-ID 04-02682-ID 04-02690 (Sep. 14, 1995).

Press Release, "PSA Chair Elaine LaRoche Warns Bond Market Professionals to Harness Technology or Become Obsolete," ID 04-02691-ID 04-02692 (Apr. 26, 1996).

Parity, "Running the Parity program," (1994 Twenty First Century Municials), ID04-02745-ID 04-02758.

Patent Maintenance Fees—Public Inquiry, Patent # 6161099, TF 054438.

*Muniauction, Inc.* v. *Thomson Corp.*, Verdict Form, 6 pages (Oct. 5, 2006).

*Muniauction, Inc.* v. *Thomson Corp.*, Transcripts dated Mar. 31, 2006; Sep. 6, 2006; Sep. 25-28, 2006; Oct. 2-5, 2006.

*Muniauction, Inc.* v. *Thomson Corp.*, U.S. Court of Appeals for the Federal Circuit, Non-Confidential Joint Appendix, vols. I-III (Nov. 2, 2006).

* cited by examiner

*— 28*

REGISTRATION QUESTIONS (Fields displayed in bold below are required.)

| | |
|---|---|
| FIRST NAME: | |
| LAST NAME: | |
| ORGANIZATION: | |
| ADDRESS (1st Line): | |
| ADDRESS (2nd Line): | |
| CITY: | |
| STATE: | |
| ZIP: | |
| TELEPHONE: | |
| TELEFAX: | |
| E-MAIL: | |
| MOTHER'S MAIDEN NAME: | (for security reasons only, e.g., verify your identity by phone) |

*Fig. 4*

Selections

⟵ 26

| Issuer | State | Description | Size* | Auction Date* | Start Time* |
|---|---|---|---|---|---|
| City of Trial Auction (All-or-None) | OR | Limited Tax Revenue Bonds 1998 Series A | $29,000,000 | Any Day | Any Time |
| (Amendments modified 4/20/98 @ 10:14 pm) | | | | | |
| [Enter Auction] [View Notice of Sale] [View Amendments] [View POS] | | | | | |
| City of Trial Auction (Maturity-by-Maturity) | OR | Limited Tax Revenue Bonds 1998 Series A | $29,000,000 | Any Day | Any Time |
| (Amendments modified 4/20/98 @ 10:14 pm) | | | | | |
| [Enter Auction] [View Notice of Sale] [View Amendments] [View POS] | | | | | |
| City of Portland (All-or-None) | OR | Limited Tax Revenue Bonds 1998 Series A | $29,000,000 | 4/21/98 | 11:30 am EDT |
| (Amendments modified 4/20/98 @ 10:14 pm) | | | | | |
| [Observe Results] [View Notice of Sale] [View Amendments] [View POS] [Request Admission] | | | | | |
| City of Portland (Maturity-by-Maturity) | OR | Limited Tax Revenue Bonds 1998 Series A | $29,000,000 | 4/21/98 | 11:30 am EDT |
| (Amendments modified 4/20/98 @ 10:14 pm) | | | | | |
| [Observe Results] [View Notice of Sale] [View Amendments] [View POS] [Request Admission] | | | | | |

Go to: MuniAuction Home Page, Rules (modified 4/16/98 @5:01 pm), Instructions, Reminders, Results

Observe Auction: Portland.1998A.MBM
MBM Best Bids

| Auction Date | Auction Type | Start | End | Time Of Last Update | Auction Status |
|---|---|---|---|---|---|
| Tue., Apr 21, 1998 | MBM | 11:30 am | 12:00 pm | 11:13:05 am EDT | Over |

$29,000,000
City of Portland, Oregon
Limited Tax Revenue Bonds
1998 Series A

| Best MBM TIC: | Best AON TIC: | Best AON Bidder: |
|---|---|---|
| 4.9574 % (Not Winner) | 4.9526 % (Winner) | Salomon Smith Barney (Winner) |

[Refresh]

Principal

| Due | Amount* | Coupon | Price | Best Yield | Best MBM Bidder |
|---|---|---|---|---|---|
| April 1, 2000 | $1,000,000 | 3.900% | 99.703% | 4.063% | U.S. Bancorp Securities, Inc. |
| April 1, 2001 | $1,040,000 | 4.000% | 99.578% | 4.155% | U.S. Bancorp Securities, Inc. |
| ⋮ | ⋮ | ⋮ | ⋮ | ⋮ | ⋮ |
| April 1, 2016 | $2,050,000 | 5.000% | 98.004% | 5.172% | ADVEST INC. |
| April 1, 2017 | $2,160,000 | 5.100% | 98.710% | 5.208% | U.S. Bancorp Securities, Inc. |
| April 1, 2018 | $2,270,000 | 5.125% | 99.032% | 5.203% | CIBC-Oppenheimer |

[Refresh]

Click below to see other bidder results

[LEBE-DS] [WILL-MD] [PRAG-RM] [BELL-ER] [GEOR-KD] [HUTC-RD] [FIRS-RE]
[FIDE-DD] [ADVE-JL] [INTE-SF] [RAYM-JR] [A.G.-GH] [SEAT-MA] [U.S.-KS]
[MORG-TB] [COMM-CB] [EDWA-JC] [ARTE-BW] [CIBC-WH] [Cover Bids] [Bid Summary]

Go Notice of Sale, Amendments (modified 4/20/98 @ 10:14 pm), POS, Rules (modified to: 4/16/98 @ 5:02 pm) Instructions, Reminders, Selections, Results
Exit
    MuniAuction Home Page
to:

Fig. 7

Login   36/40

Auction Name: <u>AON.TRIAL. AUCTION. SeriesA</u>
Please go to <u>Registration</u> page if you have not yet registered with MuniAuction Enter your ID number: ☐

Enter your password: ☐

*Note: Password is Case-Sensitive*

[Enter]   ● as a bidder
          ○ as an observer

Exit to: <u>MuniAuction Home Page</u>

Fig. 8

Acknowledgement

In order to view this POS, you must first acknowledge that you are eligible to bid(i.e., you represent either a bank or NASD registered broker-dealer)

[I Am Eligible]   [I Am Not Eligible]

*This shall not constitute a solicitation or offer to bid or purchase these securities to such persons or in such jurisdictions to which such offerings or solicitations are not permitted. An offer or solicitation shall be made only by means of the Preliminary Official Statement.*

Back to: [Selections Page]

Fig. 9

Verification

↙ 50

Your name is Edward Pencoske.
Your firm is Thorp Reed & Armstrong.
This auction is AON.TRIAL.AUCTION.1998A.
This auction is an All-Or-None auction.

Please verify that the above information is correct.

○ YES   ○ NO

Have you read the Notice of Sale and related Amendments (modified 4/20/98 @10:14 pm), if any, and do you agree to abide by the terms and conditions?

○ YES   ○ NO

Have you read the Preliminary Official Statement?

○ YES   ○ NO

Have you read the Rules of MuniAuction (modified 4/16/98 @5:01 pm) and do you agree to abide by them?

○ YES   ○ NO

[ Enter Auction ]

Go Notice of Sale, Amendments (modified 4/20/98 @10:14 pm), POS, Rules (modified to: 4/16/98 @5:01 pm) Instructions, Reminders, Selections, Results Exit to: MuniAuction Home Page

Auction — 56

| Auction Date | Auction Type | Start | End | Time of Last Update | Auction Status |
|---|---|---|---|---|---|
| Mon., Feb 23, 1998 | MBM | 9:30 am | 10:00 am | 3:10:16 pm | Over |

$91,760,000*
The Pittsburgh Water and Sewer Authority, Pennsylvania
Water and Sewer System First Lien Revenue Bonds,
Series A of 1998
Name of firm submitting bid: MuniAuction, Inc.
This auction is competing with Pittsburgh Water and Sewer.SeriesA.AON.

70 →

| As of 3:10:16pm, bids have been submitted for all maturities. | ☐☐☐☐☐☐ |
|---|---|

72 ↘  74 ↘

| Calculate/ Update | IMPORTANT: Bidders must click the "Calculate/Update" button frequently during auction to update "Time of Last Update". Also, clicking "Calculate/Update" does not result in bid submission. | Submit Bid |
|---|---|---|

| 68 Due | 66 Principal Amount* | Coupon | Enter Either: Purchase Price | OR | Yield-to Maturity | 70 Your Status | 76 Submitted Cpn-PP--YTM |
|---|---|---|---|---|---|---|---|
| September 01, 2017 | $8,275,000 | % | % | OR | % | Not Winner | |
| September 01, 2018 | $8,695,000 | % | % | OR | % | Not Winner | |
| ⋮ | ⋮ | ⋮ | ⋮ | ⋮ | ⋮ | ⋮ | |
| ⋮ | ⋮ | ⋮ | ⋮ | ⋮ | ⋮ | ⋮ | |
| September 01, 2025 | $12,370,000 | % | % | OR | % | Not Winner | |

| | IMPORTANT: Bidders must click the "Calculate/Update" button frequently during auction to update "Time of Last Update". Also, clicking "Calculate/Update" does not result in bid submission. | |
|---|---|---|

Go to: Notice of Sale, Amendments modified 2/20/98 @ 11:23am, POS, Rules modified 2/2/98 @ 11:40am Instructions, Reminders, Selections
Exit to: MuniAuction Home Page

Fig. 10

Auction  ⟵ 56

| Auction Date | Auction Type | Start | End | Time of Last Update | Auction Status |
|---|---|---|---|---|---|
| Mon., Feb 23, 1998 | AON | 9:30 am | 10:00 am | 3:08:28 pm | Over |

$91,760,000*
The Pittsburgh Water and Sewer Authority, Pennsylvania
Water and Sewer System First Lien Revenue Bonds,
Series A of 1998

Name of firm submitting bid: MuniAuction, Inc.

Purchase Price: $ [_____] ⟵ 77
(not to be less than $89,466,000.00)

Your TIC: NO BID   Your Status: Not Winner ⟵ 76

70 ⟶ This auction is competing with Pittsburgh Water and Sewer.SeriesA.MBM.

As of 3:08:28 pm, there has been at least one all-or-none bid submitted in this auction.

72 — [Calculate/Update]

IMPORTANT: Bidders must click the "Calculate/Update" button frequently during auction to update "Time of Last Update". Also, clicking "Calculate/Update" does not result in bid submission.

74 — [Submit Bid]

| 68 Due | 66 Principal Amount* | Serial/Sinker Term | Coupon | Enter Either: Reoffering Price | OR | Yield-to-Maturity |
|---|---|---|---|---|---|---|
| September 01, 2017 | $8,275,000 | Serial ▼ | % | % | OR | % |
| September 01, 2018 | $8,695,000 | Serial ▼ | % | % | OR | % |
| ⋮ | ⋮ | ⋮ | ⋮ | ⋮ | ⋮ | ⋮ |
| September 01, 2025 | $12,370,000 | Serial ▼ | % | % | OR | % |

IMPORTANT: Bidders must click the "Calculate/Update" button frequently during auction to update "Time of Last Update". Also, clicking "Calculate/Update" does not result in bid submission.

Go to: Notice of Sale, Amendments modified 2/20/98 @ 11:23am, POS, Rules modified 2/20/98 @ 11:40am Instructions, Reminders, Selections
Exit to: MuniAuction Home Page

*Fig. 11*

Error

Sorry. Your bid was invalid for the following reasons:

1. For the Sinking Fund redemptions maturing on September 01, 2022 you are not allowed to enter a yield.

2. For the Sinking Fund redemptions maturing on September 01, 2022 you have entered price or coupon values that are not identical to the values for the corresponding Term bonds maturing on September 01,2023.

3. You specified bonds maturing on September 01, 2020 as Term bonds, but you did not specify bonds for the preceding maturity as Sinking Fund redemptions (i.e., "Sinker").

4. You specified bonds maturing on September 01, 2018 as Sinking Fund redemptions, but you did not specify the subsequent maturity as either Sinking Fund redemptions (i.e., "Sinker") or Term bonds.

*To specify any maturity as a term bond maturity, you must specify one or more preceding maturities as Sinking Fund redemptions.*

5. For the bonds maturing on September 01, 2017 you entered a coupon less than 1.00%.

6. Your Purchase Price must not be less than $89,466,000.00.

7. For the bonds maturing on September 01, 2017 your coupon entry of 0% does not conform to the rules of the auction. Coupon entered must be non-zero.

To return to the Auction Page with your most recent inputs, click the BACK button below.

[BACK]

To restore the Auction Page to your last successfully submitted bid, click the Restore button below (Warning: If no bid has yet been successfully submitted, clicking the Restore button will return you to a blank Auction Page).

[RESTORE]

Go to:   Notice of Sale, Amendments (modified 2/20/98 @ 11:23 am, POS, Rules (modified 2/20/98 @ 11:40 am) Instructions, Reminders, Selections Exit to:   MuniAuction Home Page

*Fig. 12*

Confirmation

| Auction Date | Auction Type | Start | End | Time Of Last Update | Auction Status |
|---|---|---|---|---|---|
| Any Day | AON | | | 4:57:37 pm | |

$91,760,000*
AON Trial Auction (Series A), Pennsylvania
Water and Sewer System First Lien Revenue Bonds,
Series A of 1998

Name of the firm submitting bid: MuniAuction, Inc.
Are you sure you want to submit the following bid?

[No, Go Back]     [Yes, Submit Bid]

Purchase Price: $90,000,000.00

Your TIC: 6.0803 %

| Due | Principal Amount* | Serial/ Sinker/ Term | Coupon | Price | Yield |
|---|---|---|---|---|---|
| | | Beginning of Term group | | | |
| September 01, 2017 | $8,275,000 | Sinker | 5.000% | 100.000% | ... |
| September 01, 2018 | $8,695,000 | Sinker | 5.000% | 100.000% | ... |
| September 01, 2019 | $9,140,000 | Sinker | 5.000% | 100.000% | ... |
| September 01, 2020 | $9,610,000 | Sinker | 5.000% | 100.000% | ... |
| September 01, 2021 | $10,105,000 | Term | 5.000% | 100.000% | 5.000% |
| | | End of Term group | | | |
| September 01, 2022 | $10,630,000 | Serial | 6.000% | 100.000% | 6.000% |
| | | Beginning of Term group | | | |
| September 01, 2023 | $11,180,000 | Sinker | 7.000% | 100.000% | ... |
| September 01, 2024 | $11,755,000 | Sinker | 7.000% | 100.000% | ... |
| September 01, 2025 | $12,370,000 | Term | 7.000% | 100.000% | 7.000% |
| | | End of Term group | | | |

Go to: Notice of Sale, Amendments (modified 2/20/98 @ 11:23 am, POS, Rules (modified 2/20/98 @ 11:40 am) Instructions, Reminders, Selections Exit to: MuniAuction Home Page

Fig. 13

Administration

Auction Permissions: Pittsburgh Water And Sewer SeriesA.AON

[Observe All] [Change Auction Permissions] [Return to Menu]

| Admission Status | Allow Bid | Allow Obs | ID Number | Organization |
|---|---|---|---|---|
| Requested | ☐ | ☐ | MUNI-DV | MuniAuction, Inc. |
| Requested | ☐ | ☐ | SHOD-RO | The Shodor Education Foundation |
|  | ☐ | ☐ | CMU-DH | CMU |
| ... | ... | ... | ... | ... |
| ... | ... | ... | ... | ... |
| Requested | ☐ | ☐ | ONLI-KO | OnLine Partners |
|  | ☒ | ☐ | SHOD-MS | Fulcrum |
|  | ☐ | ☐ | TEST-MT | Test, Inc. |

[Change Auction Permissions] [Return to Menu]

*Fig. 14*

Administration

Create New Auction

Date of Auction:
Month [January ▼] Day  Year

Start time: [ ]:[ ]  End time: [ ]:[ ]

Settlement Date:
Month [January ▼] Day  Year

Dated Date:
Month [January ▼] Day  Year

Date of First Interest payment:
Month [January ▼] Day  Year

First Optional Call Date:
Month [January ▼] Day  Year

Good Faith Deposit: $ [ ]

Clearing Agent Fee:      [ ] costs per $1,000 bond
Overnight Loan Charges:  [ ] costs per $1,000 bond

| Auction Type |
|---|
| O Trial Auction |
| O Live Auction |
| Options: |
| O All-or-None |
|    Minimum Allowable Purchase Price: [ ]% |
|    O Allow Serials/Sinkers/Terms |
|    O Allow Serials Only |
| O Maturity-by-Maturity |
| O Display Best TIC/Yield and Status |
| O Display Status but Hide Best TIC/Yield |
| O Hide Best TIC/Yield and Status |
| Auction Bidding Method: |
|    O Coupon and Price |
|    O Coupon And Yield |
|    O Coupon and Price or Yield |
| Competition |
|   O No Competition. |
|   O This auction will compare with: |
| Bid Restrictions: |
|    Single Bid |
|    Multiple Bids |

| Maximum Allowable Reoffering Price | [ ]% |
|---|---|
| Minimum Allowable Reoffering Price | [ ]% |
| Maximum Allowable Coupon | [ ]% |
| Minimum Allowable Coupon | [ ]% |

| Ascending Yields Required |
|---|
| Ascending Yields Not Required |
| Zero Coupons Allowed |
| Zero Coupons Not Allowed |
| Zero Coupons Required |
|   Total to Display: [ ] |
| No restrictions on coupons |
| Coupons must be multiples of: |
|   1/8th of 1% |
|   1/20th of 1% |
|   Either 1/8th or 1/20th of 1% |
| Allow All bids |
| Allow Better Bid Only |

Number of maturities to [ ]
be offered:

Auction names: [ ]

Issuer: [ ]

County (If applicable): [ ]

State:

Auction Description:

PROCESS AND APPARATUS FOR CONDUCTING AUCTIONS OVER ELECTRONIC NETWORKS

This application is a continuation of application Ser. No. 09/666,559, filed Sep. 21, 2000, now abandoned which is a continuation of application Ser. No. 09/087,574, filed May 29, 1998, now U.S. Pat. No. 6,161,099 which claims the benefit of provisional Application No. 60/047,876, filed May 29, 1997. The entire content of these are hereby incorporated by reference in this application.

BACKGROUND OF THE INVENTION

1. Field of the Invention

The present invention relates to a method of conducting auctions, particularly original issuer municipal bond auctions, over electronic networks, particularly the Internet.

2. Description of the Prior Art

A conventional auction is a prior art process in which bids from bidders are received by an auctioneer for an item to be sold. The bidder whose bid is the highest at the termination of the auction (the "successful bidder") becomes the purchaser of the item.

Auctions may be conducted in a variety of ways. In the "silent real-time" auctions bidders are made aware at all times of the magnitude of the current highest bid but do not know the identity of the highest bidder. So long as the auction is still in progress, the bidders may increase their bids. Silent real-time auctions generally end at a specific announced time and any bid submitted by that time is considered in determining the successful bidder.

Another style is the "public real-time" auction, in which bidders are made aware both of the current highest bid and the identity of the bidder. Public real-time auctions are conventionally held by open verbal outcry and are terminated by the fall of the auctioneer's hammer after warning is given to the bidders of the imminent close of the auction.

Other types of auctions are known. In a sealed-bid auction, bidders are given the chance to make only one secret bid. They do not know either the current highest bid or the identity of the current highest bidder. In a "silent and blind auction" the specific bids and identity of the bidders is maintained in secret until close of the auction. Yet other types of auctions differ from the foregoing in that offers to sell may be made by the auctioneer in decreasing price increments, the first buyer to accept a bid being the winner. This type of auction is also known as a "Dutch flower auction." In another type, the winner is the party who makes the highest bid, but he pays the amount bid by the second-highest bidder. Many variations on these auctions are also known.

It is a drawback of the above types of auctions that the bidders must either gather together in the same physical location with the auctioneer or remain in contact with the auctioneer by telephone or video conference facility. Bidders who are in the physical presence of the auctioneer may have an advantage because they are able to respond to the auctioneer's reaction to a bid more rapidly than those at remote locations are.

A variety of electronic auctioning and trading systems have been developed, including electronic auction systems relating to financial instruments. Examples of these can be seen in U.S. Pat. Nos. 5,640,569 to Miller et al, 5,375,055 to Togher et al, 5,243,515 to Lee, 5,136,501 and 5,077,665 to Silverman, et al, 4,980,826 and 4,903,201 to Wagner, 4,789,928 to Fujisaki and 3,581,072 to Nymeyer.

The Miller patent is directed to an electronic "auctioning" system specifically directed to allocating computer resources such as transmission bandwidth of a multiplicity of network links interconnecting the users. The system uses a type of second price sealed bid method. The system allocates resources to maximum declared values based upon the second highest bid such that successful bidders are charged what is referred to as an opportunity costs for the goods.

The Togher et al patent discloses a credit management system for an electronic brokerage system. The brokerage system disclosed involves a communications network for facilitating the buying and selling of large blocks of foreign currency. In particular the system provides that each bid or offer for bid for a particular type of financial instrument is prescreened by the system for compatibility with limited credit information. The system identifies that, at least in currency, the resulting price may be based upon a composite of bids for small sizes or lots of the currency in question.

The Lee patent discloses a secure teleprocessing bidding system relating to a secret bidding process. The system maintains the bids secret from other bidders until after the period for bidding is closed. The system is intended to eliminate bid procedure violations and provides an electronic record of the bids received.

The Silverman et al patents disclose an electronic trade matching system for trading instruments in which bids are automatically matched against offers for the given trading instruments. The system uses a network to connect the host computer with bidding and offering clients of the system.

The Wagner patents disclose a voice actuated futures trading exchange. The system is described as a computerized public outcry exchange system for transacting sales of a particular futures commodity contract by members of a futures trading exchange wherein bids to purchase or offers to sell the particular commodity are made by members through remote terminals and the exchange computer automatically matches offers and bids to complete the transaction. The system provides that the offers may be orally entered into the system.

The Fujisaki patent discloses an auction information transmission processing system that sets up a hierarchical system of host and server computers, which are configured to minimize the data transmitted between computers during an auction. The system is designed to allow auction participants to be spread out over a wide area. The system was directed to auctioning of specific items such as used cars.

None of the above described patents are directed to original issuer auctions of financial instruments. With auctions of various financial instruments there is a significant difference between the original issuer and subsequent resale of portions of this instrument in the secondary market. Once in the secondary market the financial instrument or portions thereof become fungible commodities appropriate for trading in various trading forums including some of the electronic trading systems described above. The present invention is directed to original issuer auctions, which involve distinctly different issues than those associated with the secondary market.

None of the existing electronic trading or auctioning systems addresses the needs of original issuer auctions of financial instruments, such as municipal bonds. In the domain of original issuer municipal bond auctions, conventionally competitive bids for new municipal bond offerings are submitted to the issuer via fax machine or US mail or in person and qualified bids must be for all of the bonds in the issue ("all-or-none"). In addition to fax submissions, $21^{st}$ Century Municipals, Inc. has developed a modem based electronic bid submission system using a computer network and sold under the trademark PARITY. The PARITY bid submission system allows bidders who have previously obtained and installed appropriate software to electronically submit bids in an auction over a computer network. The PARITY system is designed to be used together with fax and other bid submission methods during an auction. The PARITY system is designed as a sealed bid system such that the bids received are not reviewed until after the auction closes, and there is no feedback to the bidders during the auction.

In a conventional original issuer municipal bond auction, there is a fixed time (e.g. 10:30 a.m., EST) on a predetermined date ("sale date") that bids must be delivered to the issuer. Because bidders are sensitive to on-going interest rate movements in the capital markets while preparing their bid, they prefer to wait until the last minute before submitting the bid to be as competitive as possible and avoid the risk that other bidders will learn the details of their bid before the deadline. This system essentially mimics a sealed bid arrangement in this respect.

It is a drawback of bids submitted by mail that the bids must be submitted too far in advance to competitively reflect the market conditions when the bid is due.

It is a drawback of fax auction methods that faxed bids are transmitted after the deadline, fax clocks are not set properly and record the incorrect time in fax headers, fax transmission interruptions outside the control of the sender and receiver and machine malfunctions such as paper misfeeds occur.

It is a drawback of in-person bidding methods that bidders have difficulty locating the place where bids are to be delivered or may experience traffic or other delays in submitting bids. Also, because the most frequent participants in competitive bids for new issues are located in New York City and the issuers are in other parts of the country, it is extremely difficult for many bidders to deliver their bids in person.

It is a drawback of the PARITY bid submission system that to use electronic bid submission the bidders must previously obtain and install the appropriate software, resulting in essentially a closed computer network. An additional drawback with the PARITY system is that no feedback is provided to the bidders. The system incorporates all of the drawbacks inherent in these other bid submission systems.

It is a drawback of prior art bidding methods for original issuer auctions of financial instruments that frequently bids are not submitted in conformity with issuers' specifications as set forth in a Notice of Sale or similar solicitation document. It is a drawback of fax bid methods that faxes may not be legible at the receiving end. These problems can create controversy between bidders and embarrass municipal officials and their financial advisors conducting original issuer municipal bond auctions. They can also cost the issuer money (e.g. if the best bid has to be disqualified as a result of one of these malfunctions or mistakes).

Further drawbacks of prior art bidding methods in original issuer municipal bond auctions are:

1. Bidders cannot see bids submitted by other bidders and are thus precluded from using this information to make their bids more competitive;
2. Once having submitted a bid, a bidder is not given an opportunity to correct or improve their bid in the event it does not conform in some way to the issuer's bids specifications;
3. Bidders cannot submit bids for selected bond maturities; bids must be "all-or-none"; meaning they must purchase every single maturity in the issue or none of them;
4. Regional and small underwriters are precluded from submitting bids because they do not have sufficient capital or desire to purchase every maturity in an issue (i.e. all-or-none);
5. Institutional investors and other bidders who are not underwriters do not submit bids because they desire only selected maturities rather than all of the bonds in an issue;
6. There is a delay after bids are submitted and before awarding a contract to the successful bidder because it is necessary for the issuer to transcribe the bids into a computer spreadsheet or other program that computes which bid is the best one; furthermore, it is usually necessary to resize the principal maturity amounts after determining the winning bid, which results in further delays before the sale is made;
7. There is no effective security mechanism to reassure issuers that bids submitted via fax or other method are bona fide offers from qualified bidders;
8. There is no built-in safeguard that alerts bidders before submitting their bid when they attempt to make a bid which does not conform to the issuer's specifications (e.g., exceeding the issuer's premium or discount limitations, interest rate coupons which are not multiples of a predetermined percentage, etc.).

The prior art does not disclose a method of conducting original issuer municipal bond auctions mediated by computer in which the bidders may be distributed in different physical locations yet by which either a silent real-time auction or a public real-time auction may be conducted.

SUMMARY OF THE INVENTION

According to one embodiment, the present invention is directed to a computer implemented process comprised of the steps of: establishing communications over a network between an auctioneer's computer and a plurality of bidders' computers; providing information regarding financial instruments to be sold to potential bidders; submitting at least one of a maturity by maturity bid or an all-or-none bid via the bidder's computer; accepting one or more of the submitted bids; and displaying the current best bid while the auction is in process. Information in addition to the current best bid which may be displayed includes the identity of the bidder, showing the status of a plurality of bidders, or showing a no-bid status on a portion of the financial instrument.

The present invention also provides for selectively displaying selected auction and bid status information during the course of the auction to non-bidding observers of the auction via the network on the observers' computers. This allows for third party observation of the auction in real time. The present invention can selectively provide information concerning the auction to participants and observers from the auctioneer's computer via the network after the closing of the auction.

The present invention also provides for verifying that each bid is in conformance with predetermined bid parameters and gives the bidder an opportunity to review and confirm bids prior to the bids being actually recorded on the auctioneer's computer. The bid verification may include automatically refusing acceptance of submitted bids that do not conform to predetermined bid parameters, and providing feedback to the bidder of a proposed bid by providing the bidder with a summary of the proposed bid prior to bid submission. The present invention also screens bidders via the network to qualify bidders to submit bids and provides documentation of the qualification of the individual bidders.

The present invention includes an electronic bid calculation sheet, which is supplied to the bidder over the network, wherein the electronic bid calculation sheet allows each bidder to prepare proposed bids including calculation of the cost of a proposed bid, and calculation of the various components of that cost including commissions, concessions, etc., prior to submission of the bid. The electronic bid calculation sheet is adapted to selectively display the bidder's last submitted bid without disturbing proposed bid information on the spreadsheet.

The operation of the present invention includes a plurality of computers that are connected to an electronic network, in particular the Internet. Each bidder may use their own personal computer. The bidders' computers are provided with commercially available browser software that communicates through the network with an auctioneer's server. Auction terms and conditions, and a description of the instruments to be auctioned, are broadcast or otherwise made available by the-auctioneer's server to the bidders' computers. During the auction the auctioneer's server broadcasts or otherwise makes available selected bid information such as bidder status (i.e., leader or not leader), or the current highest bid and, if desired, the identity of the current highest bidder. Software on the server, or perhaps on the bidders' computers in a JAVA implementation, guides the bidders through the bidding process and provides computational assistance in preparing their bids and comparing them to the current highest bid. The bidder may prepare a tentative bid, review it and modify it before submitting it. A confirmation step may be implemented to insure that the bid is correct before it is submitted. When a bid is "submitted", it is compared with the current highest bid. If the submitted bid is higher than the current highest bid, it becomes the new current highest bid and, if desired, is made available to all bidders. At the close of the auction, the auctioneer's computer notifies the bidders' computers of the successful bid. The auctioneer's computer also maintains a database of all bids which can be accessed by interested parties for their own use. Those and other advantages will be clarified in the description of the preferred embodiment together with the attached figures in which like reference numbers represent like elements throughout.

BRIEF DESCRIPTION OF THE DRAWINGS

For the present invention to be easily understood and readily practiced, preferred embodiments will now be described, for purposes of illustration and not limitation, in conjunction with the following figures:

FIG. 4 illustrates a series of questions which may form a portion of the registration process;

FIG. 5 illustrates an example of a selections page;

FIG. 6 illustrates an example of an observation page;

FIG. 7 illustrates an example of a log-in page;

FIG. 8 illustrates an example of an acknowledgment page;

FIG. 9 illustrates an example of a verification page;

FIGS. 10 and 11 illustrate two examples of bid preparation/submission pages;

FIG. 12 illustrates an example of an error page;

FIG. 13 illustrates an example of a confirmation page; and

FIGS. 14 and 15 illustrate two examples of administration pages.

DETAILED DESCRIPTION OF THE PREFERRED EMBODIMENTS

The present invention concerns original issuer municipal bond auctions in which a municipality ("Issuer") offers its bonds to purchasers, generally underwriters who resell them to the public. The present invention is also applicable to corporate commercial paper, corporate bonds and notes, U.S. Treasury auctions, equity offerings, and, in general, any financial instrument. In a municipal bond auction, the municipality desires to raise the greatest possible amount of money for its bonds and therefore desires a large number of competitive bidders. Bids in municipal bond auctions may be complex because of the need to bid on a package of multiple bonds having differing principal amounts and maturity dates. Comparing one's prospective bid against the current highest bid involves more than a simple comparison of two numbers. It is difficult to do this comparison rationally in real-time without computational assistance.

Bonds are offered to underwriters ("bidders") by means of two official documents prepared by the Issuer: a Notice of Sale and a Preliminary Offering Statement ("POS" or "Prospectus"). The Notice of Sale describes the terms of the offering in detail. The POS describes the bonds being issued in detail, including such terms as the legal authority of the Issuer to issue them, a description of the security being offered to the purchaser, and the like. The terms of both the Notice of Sale and the POS are essential to the preparation of a bidder's bid.

Figure 1:
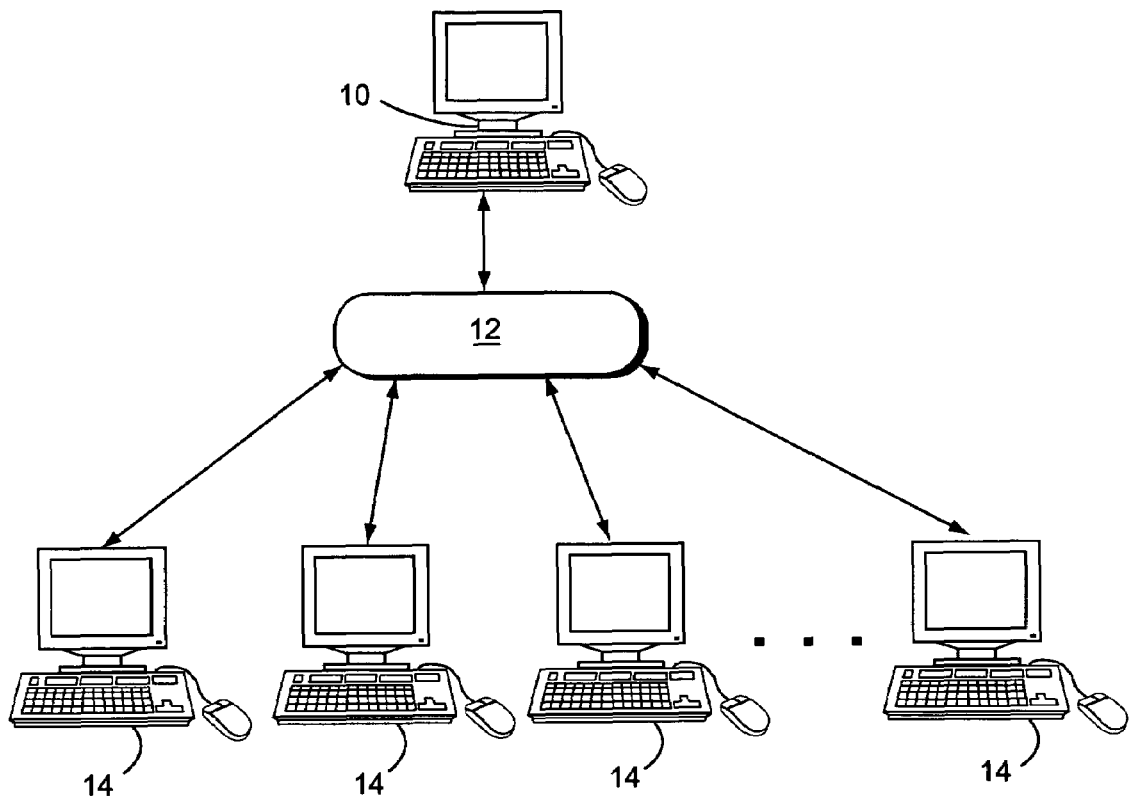
FIG. 1 illustrates a network over which the present invention may be practiced.
Figure 2:
FIG. 2 illustrates an example of a home page from one implementation of the present invention.

In a preferred embodiment; the auction is conducted by an auctioneer hired by the Issuer to solicit and receive bids. As shown schematically in FIG. 1, in a preferred embodiment, the auctioneer is provided with a computer/server 10 connected to a network such as the Internet 12. The auctioneer maintains a web site on the Internet through the server that may be accessed by users. As used herein, the term "user" means any person who accesses the auctioneer's web site, including the auctioneer, bidder, Issuer, Issuer's financial advisor or auction administrator. In a preferred embodiment, each user may use his or her own personal computer 14 connected to the Internet 12. Computers 14 are provided with conventional web browsing software to obtain access to the auctioneer's web site. A portion of one example of the home page 16 of the auctioneer's website is illustrated in FIG. 2.

The user is presented with a series of screens to guide him through the bidding process, illustrative examples of which are shown throughout the figures. In a preferred embodiment, the source code implementing these screens resides entirely in the auctioneer's computer 10 and is downloaded as HTML to the user's computer 14 as each screen is accessed. In an alternative embodiment, portions of the source code implementing certain features remains resident on the user's computer, e.g. in the form of applets written in the JAVA language. In the preferred embodiment, the source code that supports operation of the auctioneer's web site is written in HTML (Hypertext Markup Language), PERL 5, and Mini SQL (Structured Query Language).

In a preferred embodiment, for security reasons each user must either register or make arrangements in advance with the auctioneer to receive an identification number ("ID") to obtain access to auction information and to enter or review bids. Registration is schematically illustrated as elements 18 and 20 in FIG. 3a.

The applicant's web site, in particular the home page 16, can be accessed by any interested person using URL http://www.muniauction.com.

The user who "visits" the auctioneer's web site is led through a sequence of web pages and may prepare and submit bids by typing entries and using conventional mouse clicks as in accessing a typical web site.

Figure 3A:
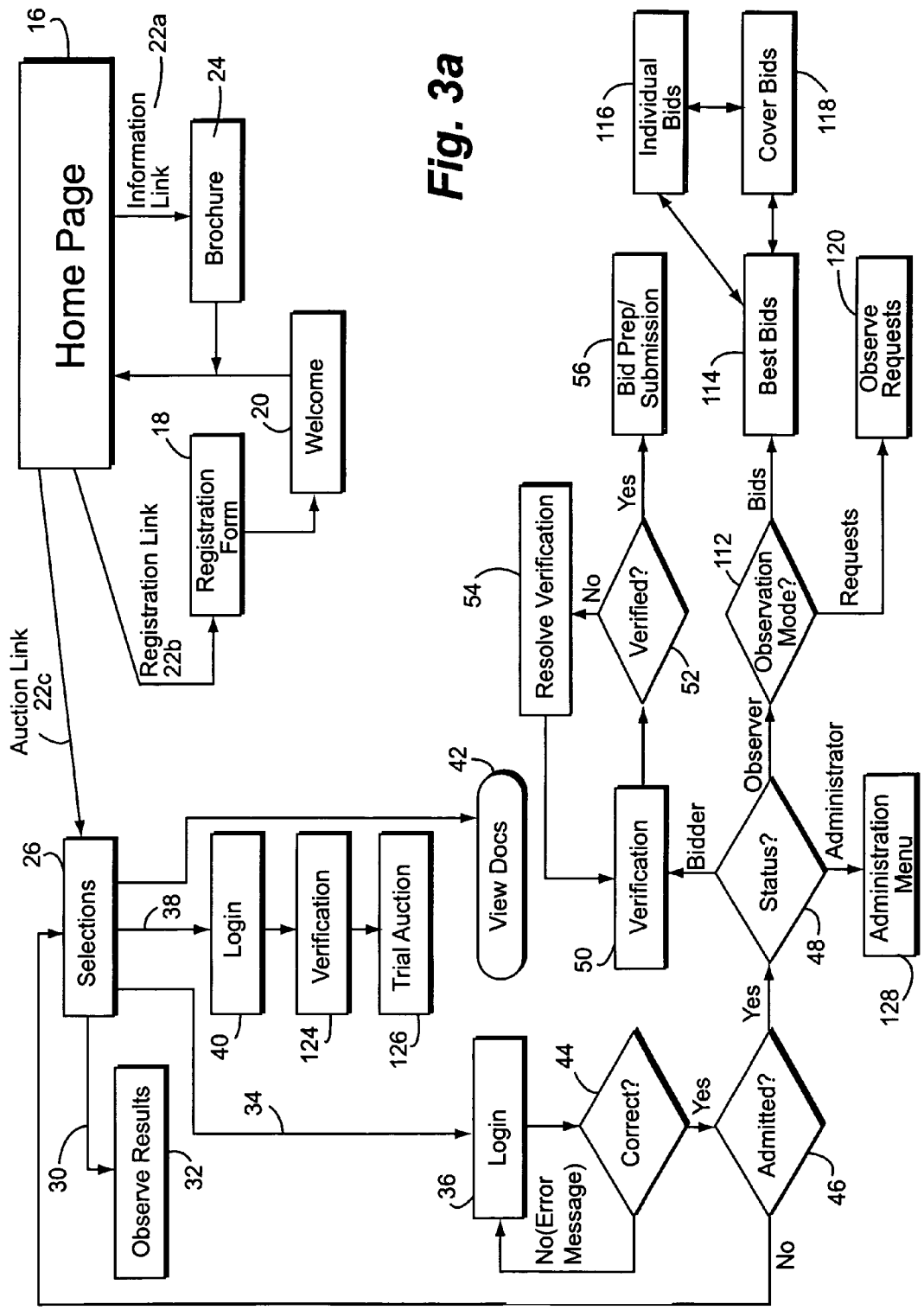
FIG. 3a is a flow chart illustrating the overall process flow of the present invention from a home page.

The site's home page 16, shown in FIG. 2, offers three links, an information link 22a to brochure 24 (FIG. 3a), a registration link 22b to registration pages 18, 20 (FIG. 3a) and auction link 22c to a selections page 26 (FIG. 3a).

The "Brochure" pages 24 are a description of the electronic auction, why it is useful, how it works, its benefits to issuers and bidders, special features and where to call for an on-line demonstration.

The "Registration" pages 18 and 20 contain appropriate forms to be completed by those interested in submitting bids. A portion of a web page 28 shown in FIG. 4 may be part of the registration page 18 shown in FIG. 3a. Parties must register so that their credentials can be verified prior to issuance of security information enabling them to make legitimate bids. Registration is necessary to prevent unauthorized persons from interfering with, or obtaining information about, the auction.

The "Auction" link 22c of home page 16 leads to the selections page 26 from which a user may enter the auction. An example of the selections page 26 is shown in FIG. 5.

The selections page 26 lists the bond auctions which are either completed, in progress, or anticipated. The auctions may be trial auctions in which users can view and practice bidding or real auctions. The listing may include the name of issuer, the state where the issuer is located, a brief description of the bonds being sold, the size of the issue, the scheduled auction date, and start time. Each possible auction may have a group of selections such as "Enter Action" for auctions upcoming or in progress, "Observe Results" for completed auctions, "View Notice of Sale", View Amendments", and "View POS". If the "Observe Results" option is chosen, the user is directed through branch 30 to page 32 (See FIG. 3a) in which the user may view the auction results which the issuer chooses to make available. See FIG. 6 for an example of an observation page 32. For example, the issuer may choose to show only the amount and name of winning bidders or may choose to display complete bid histories for the auction. Preferably the information to be made available after the auction will be disclosed in advance to the auction participants.

When an upcoming or current auction is selected at selections page 26, the user is directed through current auctions branch 34 to a login page 36 (See FIG. 3a). If the user selects "Enter Auction" for a trial auction, trial auction branch 38 takes the user to login page 40. The login page 40 may appear as shown in FIG. 7.

In the selections page 26, the user is provided with the multiple linked options "View Notice of Sale," "View Amendments", etc. Depending upon which issue is selected, the corresponding document will be displayed. That is shown collectively as "View Documents" 42 in FIG. 3a.

The "View Notice of Sale" option causes the complete text of the Notice of Sale to be displayed to the user. The Notice of Sale is provided to the auctioneer in advance by the Issuer, typically in machine-readable form, is converted to HTML or Adobe Acrobat, and stored on the auctioneer's web server for access by users.

The "View POS" option takes the user to an acknowledgment page shown in FIG. 8. To view the POS, the user must first acknowledge that the user is eligible to bid. If the user indicates that the user is not eligible, then the user returns to the selections page 26. Selection of the "eligible" option causes the complete text of the Preliminary Official Statement for the issue selected to be displayed. The POS is supplied to the auctioneer typically in machine-readable form by the Issuer, converted to HTML text or Adobe Acrobat, and then stored on the auctioneer's web server for access by users. Because the POS is a multi-page document, the auctioneer may create hypertext links to various parts of the POS from the items listed in the related table of contents to facilitate quick access by the user to selected portions of the document or rapid review and retrieval of information.

A "View Rules of Auction" link (not shown) may be provided which causes a text document stipulating the rules and conventions that all bidders must acknowledge or agree to abide by when participating in the auction. It also explains how disputes, if any, will be resolved, how bids are sequenced (e.g., first-in, first-out) and processed by the source code, what mathematical formulas and conventions are used to calculate prices and yields, and how purchase amounts may be altered after the auction to accommodate re-sizing.

The log-in page 36 is used to ensure that the user is identified and is verified to be legitimate. It requires the user, as a condition to entering the specific auction chosen, to enter its company identification number (ID) assigned by the auctioneer and their password, which is predetermined by the user. If the ID number or password is not correct as shown at step 44, the user will link automatically to an Error message (not shown) explaining that one (or both) is incorrect and that they should click the BACK button to return to the log-in page 36. After a correct log-in of a registered user is checked at step 44, the system checks at step 46 to determine if this registered user is admitted or allowed to participate in the selected auction, and verifies their status at step 48. If properly registered and admitted, the user is directed to verification page 50.

The verification page 50, an example of one type of which is shown in FIG. 9, is used as a double check on the identity of the user and to verify that the user, if bidding, agrees to abide by the rules of the auction. It contains a list of questions that must be answered affirmatively by clicking the "yes" response option after each one before the user can proceed to the auction page. If any of the questions is not answered or answered "no" as verified at step 52, the user will be linked to an error message 54 identifying the question (or questions) which has not been answered properly and directing the user to either contact the Administrator (by e-mail link) for assistance or click the BACK button to return to the verification page 50. The verification procedure provides a documented history that the user has reviewed the relevant materials including the Notice of Sale and POS. If an acknowledgement from the user, i.e. answering yes to all the questions, is not received, step 52 prevents the user from participating in the auction.

As shown in FIG. 9, three of the questions contain direct links to the Notice of Sale and Amendments, POS, and Rules of MuniAuction, respectively, which the bidder can view if the bidder has not already done so.

Although not currently implemented, the verification page 50 could also allow bidders to select the bid format they would like to use on the bid preparation and submission page 56 which follows, choosing either to enter the price and coupon combination or coupon and yield combination.

The bid preparation and submission page 56 is an electronic spreadsheet, or bid preparation sheet, representative examples of which are shown in FIGS. 10 and 11 and are labeled "Auction." The bid preparation and submission page 56 displays a schedule of the principal maturity amounts 66 and due dates 68 for the issue to be auctioned as well as selected bid information 70 associated with the bid for each maturity.

The selected bid information 70 is predetermined by the issuer prior to the auction and is updated continuously throughout the auction. By displaying a current best bid, which is optional, an open bid auction may be implemented. The bid status information which is displayed to each of the users may include, for example, one or more of the following: the yield of a leading bid, the identity of leading bidders, the status of the bidders (i.e., "Leader/Not Leader"), or a "no bid" status on a portion of the financial instrument. Any other appropriate information relating to the bids or the auction may also be included.

FIG. 10 illustrates a blank form upon which a user may prepare a proposed maturity by maturity bid. The user enters a coupon and price, or yield, for each principal maturity it wants to purchase. To determine the yield associated with the price and coupon combination (or the price associated with their coupon and yield combination) without actually submitting a bid, the user can click the "Calculate/Refresh" button 72, which calculates the yield (or price) without actually submitting it. If the user submits a bid and it results in a yield lower than the "best yield", whether shown or not, for that maturity, the user may choose to click the "Submit Bid" button 74 and become the new "Leader" with the "best yield" for that maturity (provided time remains before the auction ends). In a maturity by maturity auction only, if no other bidder submits a better bid before the auction ends, then the leader becomes the successful bidder or "Winner" of the auction for the relevant maturity or maturities.

FIG. 11 illustrates a blank form upon which the user may prepare a proposed all-or-none bid. The user enters a coupon for each maturity and an aggregate purchase price 77, and at the Issuer's option, a price or yield for each maturity. To determine the true interest cost (TIC) associated with the aggregate purchase price 77 and coupons combination without actually submitting a bid, the user can click the "Calculate/Refresh" button 72 which calculates the TIC without actually submitting it. If the result is a TIC lower than the "best TIC" shown, if shown, the user may choose to click the "Submit Bid" button 74 and become the new "Leader" with the "best TIC" (provided time remains before the auction ends). In an all-or-none auction only, if no other bidder submits a better bid before the auction ends, then the leader becomes the successful bidder or "Winner" of the auction.

In a maturity by maturity versus all-or-none auction, FIGS. 10 and 11 apply to maturity by maturity and all-or-none bidders, respectively. The process of calculating and submitting bids is the same, but in this format, the best maturity by maturity TIC (i.e., the aggregate TIC associated with the best yields for each maturity submitted by one or more bidders) is compared with the best all-or-none TIC (submitted by one bidder) and the lowest TIC of the two determines which bidder(s) is(are) the leader(s) or winner(s), during or once the auction is over, respectively.

The Calculate/Refresh 72 function is of great convenience. It can be implemented either in spreadsheet mode (in which a calculate/refresh operation is performed each time any entry is changed), or in delayed mode (in which calculate/refresh is performed only on demand by the user). Additionally, the spreadsheet may display the last submitted bid in field 76, which displays to the user the last submitted bid by that user. In FIG. 10, field 76 is above a column that displays this information without overwriting the remaining sections of the spreadsheet. The electronic spreadsheet is therefore adapted to display the users last submitted bid simultaneously with the bid information on the spreadsheet. In another embodiment, the bid preparation and submission page 56 may optionally assist the user in optimizing his bid.

According to one embodiment of the invention, and at the option of the Issuer, if the user attempts to submit a bid which results in a higher yield than a bid it has already submitted which became the current leading bid, it is linked to an error message page (not shown) indicating that the user is attempting to submit a bid which is worse than one they have already submitted. At that point the user should click the BACK button to return to the bid preparation and submission page 56.

Users may submit bids for one or more of the maturities listed or none at all. If a user submits a bid which does not conform to the specifications in the Notice of Sale (e.g., minimum/maximum price per maturity or coupon multiple parameters), it is linked to an error message page, an example of which is shown in FIG. 12, describing which parameter is improper and instructing the user to click the BACK button to return to the bid preparation and submission page 56.

All bids must be submitted before the auction ends. The "Start" time, "End" time and current time or "Time of Last Update" may be shown at the top of the bid preparation and submission page 56. Whenever users click the "Calculate/Refresh" button 72 or "Submit Bids" button 74, "Time of Last Update" is updated to the current time so that the user can keep track of how much time remains before the auction ends. In an alternative embodiment, "Time of Last Update" is updated automatically at brief intervals, for example, at one-second intervals.

After a user selects the submit button 74 and the bid is verified as conforming to the bid parameters, the bidder is presented with a confirmation screen, an example of which is shown in FIG. 13, to confirm the bid prior to submission. As shown in FIG. 13, a summary of the bid is presented to the user in this confirmation. If confirmed, the bid will be electronically submitted to the auctioneer computer 10. The confirmation gives a safety check to users to help them avoid the submission of erroneous or undesired bids.

Figure 3B:
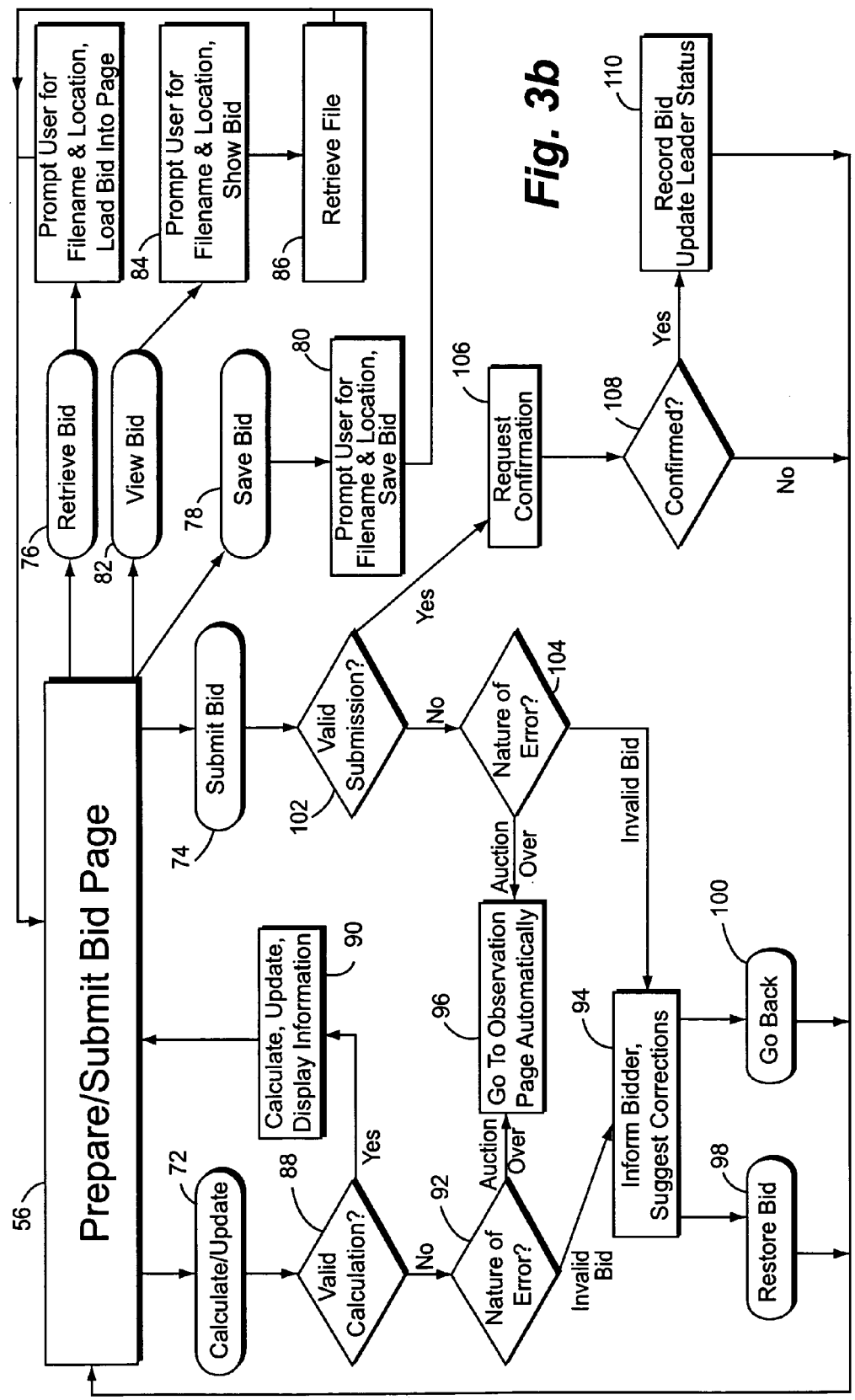
FIG. 3b is a flow chart illustrating the overall process flow with respect to the preparation and submission of a bid.

The bid preparation process and submission process described above is summarized in the flow chart in FIG. 3b. Beginning with the bid preparation and submission page 56, the user can select "calculate/update" 72, "submit bid" 74 or "retrieve bid" 76 as described above. Additionally the user may save a proposed bid at step 78 in which case the user is asked to name the file at step 80 for future recovery of the bid. Previously saved proposed bids may be viewed by selecting "view bid" 82 in which case the user is prompted to identify the file containing the saved bid at 84 and the file is retrieved and displayed at step 86.

In selecting the calculate/update option 72 a check is made at step 88 to determine if the calculation is meaningful in the context of the given auction. If the calculation is meaningful the displayed bid is updated at step 90. If the calculation is not meaningful, the nature of the error is determined at step 92 and the bidder is informed of the error with proposed corrections at step 94 unless the auction is over in which case the user is taken to the observation page at step 96. The proposed corrections to an error in the bid will allow the user to restore a previous correct bid at step 98 or go back to allow the user to correct the current proposed bid at 100.

In a similar fashion to the calculation/update process, the submit bid process verifies that the bid to be submitted it meaningful and in accordance with the appropriate predetermined bid parameters for this auction at step 102. If an error is present in the bid, the error is examined at step 104 in the same manner as step 92 of the calculation/update process. Thereafter, the process proceeds with either step 94 or 96 as discussed above. If the bid was valid at step 102, then confirmation is requested at step 106 wherein the user is displayed a summary of the bid prior to bid submission as described above. If the bid is confirmed by the user at step 108 it is submitted and recorded by the auctioneer's computer 10 at step 110.

Returning to FIG. 3*a*, the Observation mode 112 provides a special page for the Issuer and Issuer's financial advisor, or appropriate third party observers, to view the auction in progress. It shows the selected bid information of bids submitted. The observer can view a running list of best bids 114, individual bids 116 and cover (i.e., second place) bids 118. Such information may be displayed in a manner very similar to that shown in FIG. 6. As with the observe results page 32, the information illustrated on the relevant pages 114, 116, and 118 regarding the bids is predetermined before the auction. A particular Issuer may not wish to have all the bid information, such as non-winning bid histories, listed. The observation pages are updated throughout the auction by clicking the "Refresh" button. In an alternative embodiment, the observation pages are continuously updated. The observation page may be automatically accessed by Issuer and Issuer's financial advisor when "Enter Auction" is clicked and after these users enter a special ID number and password at the login page 36. The observation mode 112 also accommodates other requests of information stored in the database from users as schematically illustrated at element 120 in FIG. 3*a*.

The Observation mode may show the true interest cost of individual bids when there are bids for every maturity in the issue and winning bids and cover bids. It also may show the "resized" principal maturity amounts that coincide with the Notice of Sale parameters, the Issuer's objectives (e.g., level annual debt service), and a summary of all bids submitted by bidders.

The trial auction branch 38 leads to the login page 40 and a verification page 124 which operate similar to the login page 36 and verification page 50, respectively, previously described except that the login page 40 allows any user to select whether they want to go to the trial auction page 126 where they can practice bidding or the observation page 112 where they can observe bids. The trial auction 126 is one or more screens which simulate a real auction such that a bidder can become accustomed to the operating system without entering into an actual auction. From the trial auction page 126 the user is provided with a plurality of options such as viewing various documents, returning to the home page, etc.

The Administration menu 128 is for use by the technical staff of the auctioneer to create, modify or terminate auctions, add or remove bidders, allow user access to applicable pages (e.g., bidders to the auction page and Issuers to the observation page), and view auctions in progress. The operation of the administration menu 128 is schematically illustrated in the flow chart of FIG. 3*c* and two of the web pages accessible therefrom are shown in FIGS. 14 and 15. These pages may also show the true interest cost of the winning bids and the resized principal amounts as described above.

Figure 3C:
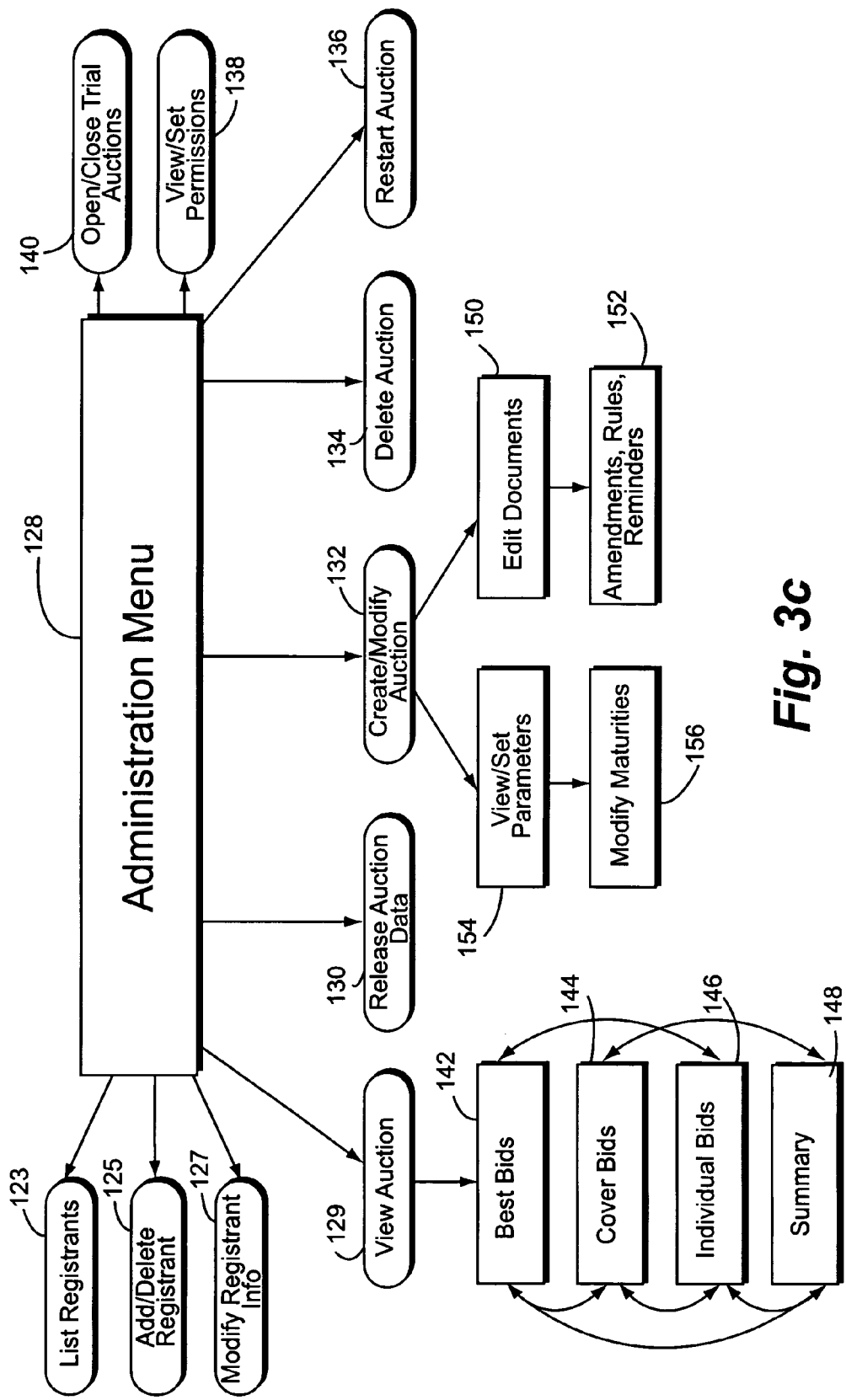
FIG. 3c illustrates the options available from an administration menu.

In FIG. 3*c*, the administrator can list registrants at step 123, add/delete registrants at step 125, or modify registrant information at step 127 as shown in FIG. 14. The administrator can view an ongoing auction at 129, release selected auction data for completed auctions at step 130, create or modify upcoming auctions at step 132 as shown in FIG. 15, delete an auction at step 134, restart an auction at step 136, view and/or set permission parameters at step 138, and open/close trial auctions at step 140. In the viewing of the auction at 129, the administrator may select best bids at 142, cover bids at 144, individual bids at 146, or a summary at 148 for viewing. In creating or modifying upcoming auctions at step 132, the administrator may choose to create or modify existing documents at 150 which will take him to the selected document at step 152, or may choose to set and or change auction parameters at 154 and/or maturity dates and amounts at 156.

At the end of an action, all winning bidders will automatically receive preliminary e-mail confirmations of their winning bids and purchase amounts (as resized), as well as a reminder that when the Issuer has made the formal award of bonds, they will receive another, final, e-mail confirmation 130.

A bidders log is provided containing a record of every bid submitted by every bidder during an auction. It identifies the bidder, the ID number and password entered by the bidder, the responses by that bidder to the questions on the verification page and the entries made by the bidder which were submitted as bids, whether winning bids or not.

Electronic mail (e-mail) confirmation is automatically generated to users on the occurrence of selected events. When a registered bidder enters its ID number and password, an e-mail confirmation is immediately sent to confirm the fact that they have entered an auction. If, for example an impostor somehow succeeds in impersonating a bidder, the bidder will receive e-mail showing that the auctioneer believes the bidder has entered the auction. This serves as a cross-check for security purposes.

The present invention provides several advantages over the prior art such as allowing bidders from around the world to participate simultaneously in a real-time auction of an original issuer financial instrument, providing bidders in an original issuer auction with computational tools, such as spreadsheets, with which to compose and compute associated cost values with their bids, providing facilities for the auctioneer in an original issuer auction to receive and evaluate bids in real-time, allowing for anonymity in silent real-time auctions or full disclosure in open auctions, requiring submitted bids to be within the Issuer's parameters, and increasing the speed at which bidders may bid so that the largest number of bids can be submitted prior to the close of an auction.

Following are further advantages of the present invention relating to original issuer actions of financial instruments:

1. Replacing bidding by fax, personal delivery or other methods;
2. Providing an integrated system running on a single server that:
   (a) allows bidders to prepare bids and submit them without transcribing them or using extraneous commercial software or equipment such as Bid Comp, Monroe Bond Calculators, Bond Buyer Worksheets, interfaces, etc.;
   (b) enables issuers, financial advisors and third party observers to view auctions in progress including selected bid information such as winning bids and bidders;
   (c) may automatically send documentation in the form of electronic confirmations of bidder admission to auction and winning bids;
   (d) may calculate true interest cost (TIC) of winning bid combinations and resize issue without requiring the Issuer or financial advisor to run separate software programs or customize spreadsheet programs;
   (e) permits the auction administrator to create, modify and view auctions in progress; and
   (f) provides one on-line location where the Notice of Sale and Preliminary Official Statement (POS) can be viewed (and amended by the Issuer) to assist bidders in preparing bids;
3. Allowing primary offerings of municipal bonds to be conducted as real-time auctions in which bidders can view selected bid information such as the best bid for each maturity and are given the opportunity to make a better offer while the auction is in progress;

4. Obviating the need for special software or hardware installation at the bidders', or Issuer's locations by allowing bidders and Issuers to use any personal computer, any Internet service provider and any web browser;
5. Allowing bids to be submitted for selected bond maturities within a new issue, rather than exclusively on an all-or-none basis;
6. Allowing an auctioneer to conduct multiple auctions simultaneously using the same web server and a single administrator,
7. Allowing bidders to participate in a plurality of auctions simultaneously or consecutively;
8. Improving the security of auctions by providing bidders and other parties that access bidding information with electronic signatures via an identification number and password and to log all bids submitted by each bidder throughout an auction;
9. Obtaining electronic verification from bidders that they have read and agree to certain legal documents associated with a bond issue, retaining their responses in a log, and if they answer "no" that they have not read the documents or do not agree with them, denying such bidders access to the auction until they answer "yes";
10. Providing a bidder with automatic notification describing any non-conforming entry via error messages when a bid does not conform to the Issuer's specifications in a Notice of Sale;
11. Providing a built-in official auction clock that keeps bidders informed of time remaining before the auction ends; and
12. Enabling bidders to recalculate and refresh a display of aspects of their bids, including calculated yield or prices associated with their entries before submitting them as formal bids.

The above described system is intended only to be illustrative of the present invention and not restrictive thereof. For example, one anticipated operation of the present invention will be to conduct all-or-none and maturity by maturity auctions for the same Issuer where the individual bidders status is not displayed to the bidder, but only a display of which maturities have not yet received a bid is presented to the bidders during the auction as the selected bid information. Additionally the present invention may be designed to allow bids to be prepared by existing information services and have these loadable into the present system through steps 84/86 shown in FIG. 3b.

Another aspect of the present invention is that it allows appropriate third parties to create and conduct auctions. If multiple separate administrators are allowed then additional security may be added to limit an administrator's access to only those auctions which it is controlling.

Further options of the present system may include:
1) Saving of bids prepared on the present system for later access and retrieval by the bidder;
2) Automatic ranking and rating of bids received to determine the best bids, wherein numerically tied bids may be broken by the time of receipt of the bids;
3) Allowing institutional investors to view the contact information for bidders who have requested access to a given auction;
4) Having bidders select to submit bids at re-offering rates and prices;
5) Having the auctioneer identify whether a bidder's bid is priced at yield to call or yield to maturity, as applicable;
6) Having the calculations be moved to the client side to reduce the hits on the home page server and increase bidder's privacy and susceptibility to network delays; and
7) Having bidders presented with the option of digitally signing bids for security which would use known standard signature schemes in either a separate or JAVA integrated utility.

It will be appreciated that although the embodiments described herein relate to financial instruments such as municipal bond auctions, the disclosed process is applicable to many other types of auctions. Various modifications may be made to the present invention without departing from the spirit and scope thereof. It will be apparent to those skilled in the art how to adapt the present invention to variant types of auctions. The scope of the present invention is to be defined by the appended claims.

We claim:

1. A computer-mediated method of conducting an auction of a financial or legal instrument over an electronic network, wherein bidders can be in different physical locations and can simultaneously participate in the auction,
said bidders having access to networked devices,
said bidders' networked devices communicating over the electronic network with at least one computer having auction software,
said method comprising:
a) enforcing at least one condition bidders must satisfy to submit competing bids;
b) enforcing at least one condition competing bids must satisfy;
c) providing a centralized time indication;
d) receiving, over the network, bids from bidders using said networked devices;
e) enabling bidders to modify their bid inputs;
f) permitting comparison of received bids; and
g) providing information allowing for display of at least the best bid.

2. The method of claim 1 including conducting multiple auctions simultaneously.

3. The method of claim 1 including offering multiple instruments in the same auction.

4. The method of claim 1 wherein bidders may participate in a plurality of auctions simultaneously.

5. The method of claim 1 wherein bidders may bid more than one instrument in the same auction.

6. The method of claim 1 wherein bidders may bid more than one instrument in multiple auctions conducted simultaneously.

7. The method of claim 1 wherein bidders may bid portions of a single instrument.

8. The method of claim 1 wherein bidders register before submitting bids.

9. The method of claim 1 wherein bidders log in with an identification and password.

10. The method of claim 1 including providing bidders online access to offering documents.

11. The method of claim 1 including providing a display that informs bidders of the time remaining in a bidding period.

12. The method of claim 1 wherein a bid improvement is made by submitting a lower bid.

13. The method of claim 1 wherein bid improvements are made in minimum increments.

14. The method of claim 1 wherein the lowest bid is the best bid.

15. The method of claim 1 including enabling bidders to supply conditions to their bids.

16. The method of claim 1 including enabling a bidder to enter and modify a bid without submitting it.

17. The method of claim 1 including enabling a bidder to confirm or acknowledge a bid after submission.

18. The method of claim 1 including enabling a bidder to view at least the best bid during the bidding period and improve it.

19. The method of claim 1 wherein rank order of bids is displayed.

20. The method of claim 1 wherein status of a bidder's bid relative to other bids is displayed during the bidding period.

21. The method of claim 1 further including providing a means for bidders to confirm their intention to submit bids before their bids are treated as submitted.

22. The method of claim 1 further including performing, for bidders, calculations using bid related inputs.

23. The method of claim 1 wherein the bidding period may be extended after bidding begins.

24. The method of claim 1 wherein information related to at least one bid submission such as time of submission is saved in a data log.

25. The method of claim 1 further including displaying an observation page from which to observe submitted bids.

26. The method of claim 1 further including releasing bidding results.

27. The method of claim 1 wherein confirmation of winning bids may be delivered electronically.

28. The method of claim 1 wherein confirmation of winning bids may be delivered automatically.

29. The method of claim 1 wherein said bidder inputs a price for said instrument.

30. The method of claim 1 wherein said bidder inputs an interest rate for said instrument.

31. The method of claim 1 wherein said bidder inputs a price and interest rate combination for said instrument.

32. The method of claim 1 wherein said bidder inputs a principal amount for said instrument.

33. The method of claim 1 wherein said bidder inputs a maturity date for said instrument.

34. The method of claim 1 wherein software such as Java applet code or plug-ins that implement certain auction related functions is delivered to bidders computers.

35. The method of claim 1 wherein one or more menu-driven web pages are employed to create and modify auction parameters.

36. The method of claim 1 wherein one or more menu-driven web pages are employed to regulate access to certain web pages.

37. The method of claim 1 wherein one or more menu-driven web pages are employed to authorize bidder participation.

38. The method of claim 1 wherein one or more menu-driven web pages are employed to set bid limitations for one or more bidders.

39. The method of claim 1 further including communicating signals relating to said auction over a network at least in part using Hypertext Transfer Protocol 40. The method of claim 1 further including not allowing bidders to change said auction rules once bidding commences.

41. In a computer system for conducting an auction of at least one financial or legal instrument over an electronic network, said computer system being configured to receive bids from bidders over the electronic network, wherein bidders can simultaneously participate in auctions from different physical locations, said computer system executing auction software stored on a storage device, said storage device storing:

first, instructions that, when executed, receive bids over the electronic network for at least one instrument from bidders using networked devices;

second, instructions that, when executed, enforce at least one condition bidders must satisfy before they can submit competing bids;

third, instructions that, when executed, enforce at least one condition competing bids must satisfy;

fourth, instructions that, when executed, provide a centralized time indication;

fifth, instructions that, when executed, enable bidders to modify their bids;

sixth, instructions that, when executed, permit comparison of received bids to facilitate determination of winning bids; and seventh, instructions that, when executed, provide information allowing for display of winning bids.

42. A computer system for mediating an auction of at least one financial or legal instrument, said computer system being configured to receive bids from bidders using web browsers, wherein the bidders can be in different physical locations and can simultaneously participate in the auction, said computer system comprising:

means for enforcing at least one condition bidders must satisfy to submit competing bids;

means for enforcing at least one condition competing bids must satisfy;

means for provide a centralized time indication;

means for receiving, over the Internet, bids from bidders using web browsers;

means for enabling bidders to modify their bid inputs;

means for permitting comparison of received bids; and means for providing information allowing for display of at least the best bid.

43. In an electronic auction system including an issuer's computer having a display and at least one bidder's computer having an input device and a display, said bidder's computer being located remotely from said issuer's computer, said computers being coupled to at least one electronic network for communicating data messages between said computers, an electronic auctioning process for auctioning fixed income financial instruments comprising:

(a) permitting data inputs associated with at least one bid for at least one fixed income financial instrument from said bidder's computer;

(b) automatically computing at least one interest cost value based at least in part on said received data, said automatically computed interest cost value specifying a rate representing borrowing cost associated with said at least one fixed income financial instrument;

(c) receiving said bid submitted by transmission of at least some data from said bidder's computer over said at least one electronic network; and (d) communicating at least one message associated with said submitted bid to said issuer's computer over said at least one electronic network, thus (e) enabling the display on said issuer's computer of information associated with said bid including said computed interest cost value, additionally comprising the step of verifying that each bid is in conformance with predetermined bid parameters before accepting said bid, wherein said process further includes providing a centralized time indication and transmitting said time indication to said bidder's computer over said electronic network, and said display enabling step includes the step of enabling display of said transmitted time indication on said bidder's computer display.

44. The process of claim 43 wherein at least one of the permitting data inputs step (a), the automatically computing step (b), the bid receiving step (c), the communicating step (d) and the enabling step (e) is performed using a web browser.

45. An electronic auction system for auctioning fixed income financial instruments, said electronic auction system comprising an auction computer for use with:
(1) an issuer's computer having a display;
(2) at least one bidder's computer having an input device and a display, said bidder's computer being located remotely from said issuer's computer, and
(3) at least one electronic network, said computers being coupled to said at least one electronic network for communicating data messages between said computers,
said auction computer executing auction software and configured to:
(a) permit data inputs associated with at least one bid for at least one fixed income financial instrument from said bidder's computer;
(b) automatically compute at least one interest cost value based at least in part on said received data, said automatically computed interest cost value specifying a rate representing borrowing cost associated with said at least one fixed income financial instrument;
(c) receive said bid submitted by transmission of at least some data from said bidder's computer over said at least one electronic network;
(d) communicate at least one message associated with said submitted bid to said issuer's computer over said at least one electronic network, thus (e) enabling the display on said issuer's computer of information associated with said bid including said computed interest cost value,
(f) verify that each bid is in conformance with predetermined bid parameters before accepting said bid, and
(g) provide a centralized time indication and transmit said time indication to said bidder's computer over said electronic network, thereby enabling display of said transmitted time indication on said bidder's computer display.

46. The system of claim 45 wherein said auction computer is further configured to use a web browser.

47. In an electronic auction system including plural bidders' computers and an issuer's computer located remotely from said plural bidders' computers, each of said plural bidders' computers including an associated input device and a display, said issuer's computer including a display, at least one electronic network communicating data messages to and from said plural bidders' computers and to and from said issuer's computer, an electronic auctioning process for auctioning fixed income financial instruments comprising:
receiving data from at least one of said plural bidders' computers associated with at least one bid for fixed income financial instruments;
automatically computing at least one interest cost value based at least in part on said inputted data, said automatically computed interest cost value specifying a rate representing borrowing cost associated with said fixed income financial instruments;
ordering the interest cost values associated with said inputted data;
transmitting said interest cost values over said at least one electronic network to said issuer's computer; and
enabling the display of said interest cost values on said issuer's computer's display,
wherein said ordering step includes ranking said interest cost values, and said displaying step includes displaying said interest cost values in an order determined by said ranking.

48. The process of claim 47 wherein at least one of the receiving step, the automatically computing step, the ordering step, the transmitting step and the enabling step is performed using a web browser.

49. In an electronic auction system for auctioning fixed income financial instruments comprising:
plural bidders' computers,
an issuer's computer located remotely from said plural bidders' computers, each of said plural bidders' computers including an associated input device and a display, said issuer's computer including a display, and
at least one electronic network communicating data messages to and from said plural bidders' computers and to and from said issuer's computer, an electronic auctioning process,
an auction computer coupled to said electronic network, said auction computer being configured to:
(a) receive data from at least one of said plural bidders' computers associated with at least one bid for fixed income financial instruments;
(b) automatically compute at least one interest cost value based at least in part on said inputted data, said automatically computed interest cost value specifying a rate representing borrowing cost associated with said fixed income financial instruments;
(c) order the interest cost values associated with said inputted data;
(d) transmit said interest cost values over said at least one electronic network to said issuer's computer; and
(e) enable the display of said interest cost values on said issuer's computer's display,
wherein said auction computer is further programmed to rank said interest cost values, and to enable display of said interest cost values in an order determined by said ranking.

50. The system of claim 49 wherein said auction computer is further configured to use a web browser.

51. In an electronic auction system including plural bidders' computers and an issuer's computer located remotely from said plural bidders' computers, each of said plural bidders' computers including an associated input device and a display, said issuer's computer including a display, at least one electronic network communicating data messages to and from said plural bidders' computers and to and from said issuer's computer, an electronic auctioning process for auctioning fixed income financial instruments comprising:
receiving data from at least one of said plural bidders' computers associated with at least one bid for fixed income financial instruments;
automatically computing at least one interest cost value based at least in part on said inputted data, said automatically computed interest cost value specifying a rate representing borrowing cost associated with said fixed income financial instruments;
ordering the interest cost values associated with said inputted data;
transmitting said interest cost values over said at least one electronic network to said issuer's computer; and
enabling the display of said interest cost values on said issuer's computer's display,
wherein said process further includes providing a centralized time indication and transmitting said time indication to each of said plural bidders' computers over said electronic network, and said process further includes enabling display of said transmitted time indication on each of said plural bidders' computer displays.

52. The process of claim 51 wherein at least one of the receiving step, the automatically computing step, the ordering step, the transmitting step and the enabling step is performed using a web browser.

53. In an electronic auction system for auctioning fixed income financial instruments comprising:

plural bidders' computers, an issuer's computer located remotely from said plural bidders' computers, each of said plural bidders' computers including an associated input device and a display, said issuer's computer including a display, and at least one electronic network communicating data messages to and from said plural bidders' computers and to and from said issuer's computer, an electronic auctioning process, an auction computer coupled to said electronic network, said auction computer being configured to:

(a) receive data from at least one of said plural bidders' computers associated with at least one bid for fixed income financial instruments;

(b) automatically compute at least one interest cost value based at least in part on said inputted data, said automatically computed interest cost value specifying a rate representing borrowing cost associated with said fixed income financial instruments;

(c) order the interest cost values associated with said inputted data;

(d) transmit said interest cost values over said at least one electronic network to said issuer's computer; and (e) enable the display of said interest cost values on said issuer's computer's display, wherein said auction computer is further configured to provide a centralized time indication and transmit said time indication to each of said plural bidders' computers over said electronic network, thereby enabling display of said transmitted time indication on each of said plural bidders' computer displays.

54. The system of claim 53 wherein said auction computer is further configured to use a web browser.

* * * * *

(12) EX PARTE REEXAMINATION CERTIFICATE (8371st)

United States Patent
Harrington et al.

(10) Number: US 7,523,063 C1
(45) Certificate Issued: Jun. 28, 2011

(54) PROCESS AND APPARATUS FOR CONDUCTING AUCTIONS OVER ELECTRONIC NETWORKS

(76) Inventors: Myles C. S. Harrington, Pittsburgh, PA (US); Daniel J. Veres, West View, PA (US); Robert M. Panoff, Durham, NC (US)

Reexamination Request:
No. 90/010,937, Apr. 21, 2010

Reexamination Certificate for:
Patent No.: 7,523,063
Issued: Apr. 21, 2009
Appl. No.: 10/613,319
Filed: Jul. 7, 2003

Related U.S. Application Data

(63) Continuation of application No. 09/666,559, filed on Sep. 21, 2000, now abandoned, which is a continuation of application No. 09/087,574, filed on May 29, 1998, now Pat. No. 6,161,099.

(60) Provisional application No. 60/047,876, filed on May 29, 1997.

(51) Int. Cl.
G06Q 40/00 (2006.01)

(52) U.S. Cl. .............................. 705/37; 705/26.3; 705/35

(58) Field of Classification Search .................... None
See application file for complete search history.

(56) References Cited

U.S. PATENT DOCUMENTS

| | | |
|---|---|---|
| 2,350,146 A | 5/1944 | Anders |
| 2,815,448 A | 12/1957 | Josef |
| 3,573,747 A | 4/1971 | Adams et al. |
| 5,038,284 A | 8/1991 | Kramer |
| 5,063,507 A | 11/1991 | Lindsey et al. |
| 5,220,501 A | 6/1993 | Lawlor et al. |
| 5,243,331 A | 9/1993 | McCausland et al. |
| 5,285,383 A | 2/1994 | Lindsey et al. |
| 5,297,032 A | 3/1994 | Trojan et al. |
| 5,394,324 A | 2/1995 | Clearwater |
| 5,539,450 A | 7/1996 | Handelman |
| 5,553,145 A | 9/1996 | Micali |
| 5,666,420 A | 9/1997 | Micali |
| 5,715,402 A | 2/1998 | Popolo |
| 5,727,165 A | 3/1998 | Ordish et al. |
| 5,761,421 A | 6/1998 | van Hoff et al. |
| 5,794,210 A | 8/1998 | Goldhaber et al. |
| 5,794,219 A | 8/1998 | Brown |
| 5,826,244 A | 10/1998 | Huberman |
| 5,835,896 A | 11/1998 | Fisher et al. |
| 6,026,383 A | 2/2000 | Ausubel |
| 6,161,099 A | 12/2000 | Harrington et al. |
| 6,876,982 B1 | 4/2005 | Lancaster |
| 6,996,540 B1 | 2/2006 | May |
| 7,571,136 B2 | 8/2009 | May |
| 2006/0095363 A1 | 5/2006 | May |
| 2006/0190383 A1 | 8/2006 | May |
| 2007/0219882 A1 | 9/2007 | May |
| 2007/0288346 A1 | 12/2007 | May |

FOREIGN PATENT DOCUMENTS

AT 201272 6/2001

(Continued)

OTHER PUBLICATIONS

Martin, Jr. David M. et al, "Blocking Java Applets at the Firewall", 1997, IEEE, pp. 16–26.*

(Continued)

Primary Examiner—Karin M. Reichle

(57) ABSTRACT

An apparatus and process for conducting auctions, specifically municipal bond auctions, over electronic networks, particularly the Internet, is disclosed. The auctioneer maintains a web site from which information about bonds to be auctioned can be obtained. A user participates in the auction by accessing the web site via a conventional Internet browser and is led through a sequence of screens that perform the functions of verifying the user's identity, assisting the user in preparing a bid, verifying that the bid conforms to the rules of the auction, displaying to the user during the course of the auction selected bid information regarding bids received and informing the bidder how much time remains in the auction. The user may be given the option of confirming the accuracy of his bid before submitting the bid. The auctioneer is able to review bidding history, determine the winner and notify the winner over the network, and display selected auction results to bidders and observers over the network.

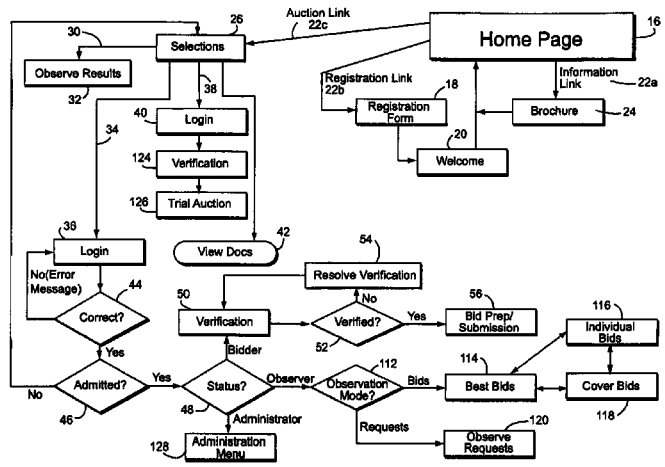

FOREIGN PATENT DOCUMENTS

| | | |
|---|---|---|
| AU | 199112703 B2 | 3/1999 |
| AU | 127039 | 5/1999 |
| CA | 2305736 A1 | 4/1999 |
| DE | 69800807 T2 | 3/2007 |
| DK | 0107/97 L | 1/1997 |
| DK | 1012764 T3 | 6/2001 |
| EP | 0411748 A2 | 5/1990 |
| EP | 0388162 A2 | 9/1990 |
| EP | 0512702 A2 | 11/1992 |
| EP | 0628920 A1 | 12/1994 |
| EP | 0716386 A2 | 12/1996 |
| EP | 0828223 A2 | 9/1997 |
| EP | 1012764 B1 | 6/2000 |
| ES | 2156435 | 6/2001 |
| FR | 2658635 | 8/1991 |
| FR | 2691560 | 11/1993 |
| GB | 1489571 | 10/1977 |
| JP | 63-168770 | 7/1988 |
| JP | 2-118876 | 5/1990 |
| JP | 5-204952 | 8/1993 |
| JP | 05-204952 | 8/1993 |
| JP | 7-37015 | 2/1995 |
| JP | 07-037015 | 2/1995 |
| JP | 850624 | 2/1996 |
| JP | 08-050624 | 2/1996 |
| JP | 8161412 | 6/1996 |
| JP | 96871 | 1/1997 |
| JP | 09-006871 | 1/1997 |
| JP | 9114907 | 5/1997 |
| JP | 2001520421 | 10/2001 |
| NL | 9201152 | 1/1994 |
| NL | 9300266 | 9/1994 |
| WO | 9722074 | 6/1997 |
| WO | 9730407 | 8/1997 |

OTHER PUBLICATIONS

McCarthy, Gene, "The Electronic Auctioning of Servicing", Mortgage Bankers Association of American, vol. 55, No. 3, Dec. 1994.

Banatre, Michel, "Distributed Auction Bidding System", IPC Business Press, vol. 4, No. 4, Aug. 1981.

Rockoff, Todd E. et al. "Design of an Internet–Based System for Remote Dutch Auctions", MCB University Press, vol. 5, No. 4, 1955, pp. 10–16.

Banatre, Jean–Pierre, et al., "The Design and Building of Enchere, A Distributed Electronic Marketing System", Association for Computing Machinery, Oct. 1984.

Dooley, Ann, "Minis Mean Control for Broker's Broker," Computerworld, vol. 11, Iss. 49, (Dec. 5, 1977).

"Using High Technology to Find Low Bidders," Business Week, vol. 2857, (Aug. 27, 1984).

Davies, Stephen, et al., "Dealers to Try Out Automated Bidding for Treasury Bills," Bond Buyer, vol. 304, Iss. 29129 (Apr. 13, 1993).

Davies, Stephen A., "Dealer to Try Out Automated Bidding for Treasury Bills in April 29 Auction," American Banker, Inc. (Apr. 13, 1993).

"Shoppersuniverse: ShoppersUniverse Brings Bidding to the Internet with the First Ever On–line Auction Room," M2 Presswire, M2 Communications LTD (Aug. 27, 1996).

"Aer Lingus: Aer Lingus Launches Internet Seat Auction," M2 Presswire, M2 Communications LTD (Oct. 31, 1996).

"El Cetera—Computer Museum Holds an Internet Auction," Open Systems Today, CMP Publications, Inc. (May 9, 1994).

French, Kimberly, "The Great Online Auction. (Computer assisted on–line auction for public television)," Ziff Davis Publishing Co. (Feb. 1, 1989).

"Online Computer Goods Auction," Newsbytes, Newsbytes, Inc. (Nov. 4, 1996).

"Save the Earth to Continue Internet Fundraising Auction of Rock'N'Roll Memorabilia Via the World Wide Web," Business Wire (Jun. 20, 1995).

Alonzo Johnson et al., "Automated Double Oral Auction Using I.B.M. PC Network," Association for Computing Machinery (ACM) (1986).

Gerald B. Sheble, "Priced Based Operation in an Auction Market Structure," IEEE (1996).

"LTU Plans Online Electronic Ticket Auctions," Reuters News, Reuters Limited (Sep. 23, 1996).

"Firm goes online with auction," The Toronto Star (Apr. 21, 1996).

Network World, "Financial Services Company Readies Bond Auction Net" (Jun. 12, 1989).

"Open bidding expends into MASH sector," Modern Purchasing, vol. 37, Iss. 9, (Sep. 1995).

Phillips Business Information, "You've Launched Your Web Site. Now What?" (Jun. 24, 1996).

"Breaking down barriers in the MASH sector: how the ITA will impact municipal procurement," Modern Purchasing, vol. 37, Iss. 9, (Sep. 1995).

Business Wire, "Onsale to Host Live Internet Auction to Benefit the National Educational Technology Initiative" (Apr. 29, 1996).

Stover, Roger, "Third–party certification in new issues of corporate tax exempt bonds: standby letter of credit and bond rating interaction, Financial Management," pp. 1–13 (Mar. 22, 1996).

Ungar, Lyle H. et al., "Cost and Trust Issues in On–Line Auctions," In Agents–98 Workshop on Agent Mediated Electronic Trading (1998).

Seydel, John, "Simulation Model for Competitive Bidding in Construction," Proceedings of the 1994 Winter Simulation Conference, pp. 1439–1442 (1984).

Oren, et al., "Optimal Bidding in Sequential Auctions," Paper No. THP3.1, Decision and Control Including the 13th Synposium on Adaptive Processes, 1974 IEEE Conference on Decision and Control, pp. 548–553 (Nov. 1974).

Lee, Ho Geun, "Electronic Brokerage and Electronic Auction: The Impact of IT on Market Structures," Proceedings of the 29th Annual Hawaii International Conference on System Sciences, pp. 397–406 (1996).

Business Wire, "World's First Real–Time Travel Auction Service Goes Live On Web At ETA Opens Beta Test to Travel Industry, General Public" (Nov. 26, 1996).

PCS News, Broadband PCs Auction Rules Specify 'Entrepreneurs' Blocks for Des, Outline Package of Preferences, Allow Partitioning, PCNN vol. 5, Issue: 14 (Jul. 7, 1994).

Canada NewsWire, "Internet Liquidators International Inc." (Jul. 11, 1996).

Business Wire, "NTN Communications and Lexus conduct live electronic auction via satellite" (Jul. 13, 1994).

Business Wire, Internet Retailer Onsale is top Shopping Site on the Web according to PC–Meter's Web Audience Rating Report; The Average Visitor Spends an Unprecedented 48 Minutes per Month on Onsale's Site (Nov. 20, 1996).

McCarthy, Gene, "The electronic auctioning of servicing," Mortgage Banking vol. 55, No. 3 (Dec. 1, 1994).

M2 Presswire, "Worldport Internet: Auction Board Personal Edition makes secure web auctions accessible" (May 29, 1997).

Nikkei English News, "Aucnet to sell used PCs via Internet Auction" (May 20, 1997).

Warren's Cable Regulation Monitory, "FCC Adopts Universal Bidding Rules for Auctions" (Feb. 24, 1997).

Government Computer News, "Office of Procurement Policy guidelines on bid submittals on–line electronic commerce" (Sep. 18, 1995).

Land Mobile Radio News, "FCC Considers Real–Time Bidding to Speed Up Future Auctions—Participants May Soon Be Able to Use Web Browser to Bid" (Oct. 11, 1996).

Reuters News, "Dresdner to offer Internet trading" (Sep. 27, 1996).

PCS News Phillips Business Information, Inc., "Telocator Addresses Auction Issues in FCC White Paper" (Sep. 2, 1993).

Business Wire, "GFOA/MBIA Survey Predicts Large Increase in Internet Access by State and Local Governments" (May 20, 1996).

Congressional Testimony by Federal Document Clearing House, "Prepared Statement Before the Subcommittee on Government Management, Information, and Technology Committee on Government Reform and Oversight House of Representatives on GPO's Role in Federal Information Dissemination" (May 8, 1997).

PR Newswire, "There's an Auction Closing Tonight at Hobbymarkets.com" (Apr. 25, 1997).

Newsbytes, "Tredex Launches Live Web Computer Auction Site" (Nov. 14, 1996).

Johnson, Paul, "Online Bidding Service Makes State Bidding Information Accessible Via Web" Wisconsin State Journal, (Nov. 7, 1996).

Lawrence, L.M., "Online information in the competitive bid process: timelines, design and content issues," National Online Meeting—Proceedings—1990 (May 1990).

Sankar, Chetan, et al., "Aucnet USA: real–time on–line auto auction," Proceedings of the 1996 27th Annual Meeting of the Decision Sciences Institute (Nov. 26, 1996).

Hegazy, T., et al., "Construction bidding on the Internet: a new perspective," Proceedings for the Fourth IASTED International Conference Computer Applications in Industry, (Dec. 1995).

PC Week, "PC gear goes on–line to raise TV viewer's uptime," vol. 5, No. 36, (Sep. 5, 1988).

Gale Group Newsletter, "Mainfraime Sales on the Internet," Report on IBM, vol. 13, No. 46, (Nov. 20, 1996).

M2 Presswire, "Debis prepares to put UK auctions on–line," (Mar. 8, 1996).

PCS News, "CalTech Provide Live Electronic Auction Demonstration," vol. 5, No. 3, (Feb. 3, 1994).

Koch, Christopher, "Where the auction is," CIO, vol. 9, No. 7, (Jan. 15, 1996).

Walsh, Campion, "Nymex, Enersoft hope gas traders dial up Channel 4 network," Oil Daily, vol. 44, No. 147 (Aug. 2, 1994).

Lauterbach, Beni, et al., "Stock market crashes and the performance of circuit breakers: empirical evidence," Journal of Finance, vol. 48, No. 5, (Dec. 1993).

PR Newswire, "Satellite Auction Network Inc.'s subsidiary, Premier Auction Services, has booked over $9 million in equipment for direct auction in March and April," (Mar. 5, 1987).

"China: Bidding for goods on highway project," China Business Information Network, (Feb. 18, 1997).

"China: Invitation for prequalification for BOT project," China Business Information Network. (Oct. 25, 1996).

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-46 and 51-54 is confirmed. Claims 47-50 are cancelled.

* * * * *

EX PARTE REEXAMINATION CERTIFICATE (9460th)
United States Patent
Harrington et al.

(10) Number: US 7,523,063 C2
(45) Certificate Issued: Dec. 26, 2012

(54) PROCESS AND APPARATUS FOR CONDUCTING AUCTIONS OVER ELECTRONIC NETWORKS

(75) Inventors: Myles C. S. Harrington, Pittsburgh, PA (US); Daniel J. Veres, West View, PA (US); Robert M. Panoff, Durham, NC (US)

(73) Assignee: Muniauction, Inc., Pittsburgh, PA (US)

Reexamination Request:
No. 90/011,674, May 6, 2011

Reexamination Certificate for:
Patent No.: 7,523,063
Issued: Apr. 21, 2009
Appl. No.: 10/613,319
Filed: Jul. 7, 2003

Reexamination Certificate C1 7,523,063 issued Jun. 28, 2011

Related U.S. Application Data

(63) Continuation of application No. 09/666,559, filed on Sep. 21, 2000, now abandoned, which is a continuation of application No. 09/087,574, filed on May 29, 1998, now Pat. No. 6,161,099.

(60) Provisional application No. 60/047,876, filed on May 29, 1997.

(51) Int. Cl.
*G06Q 40/00* (2006.01)

(52) U.S. Cl. ............... 705/37; 705/26.3; 705/35
(58) Field of Classification Search ............... None
See application file for complete search history.

(56) References Cited

To view the complete listing of prior art documents cited during the proceeding for Reexamination Control Number 90/011,674, please refer to the USPTO's public Patent Application Information Retrieval (PAIR) system under the Display References tab.

*Primary Examiner* — Ovidio Escalante

(57) ABSTRACT

An apparatus and process for conducting auctions, specifically municipal bond auctions, over electronic networks, particularly the Internet, is disclosed. The auctioneer maintains a web site from which information about bonds to be auctioned can be obtained. A user participates in the auction by accessing the web site via a conventional Internet browser and is led through a sequence of screens that perform the functions of verifying the user's identity, assisting the user in preparing a bid, verifying that the bid conforms to the rules of the auction, displaying to the user during the course of the auction selected bid information regarding bids received and informing the bidder how much time remains in the auction. The user may be given the option of confirming the accuracy of his bid before submitting the bid. The auctioneer is able to review bidding history, determine the winner and notify the winner over the network, and display selected auction results to bidders and observers over the network.

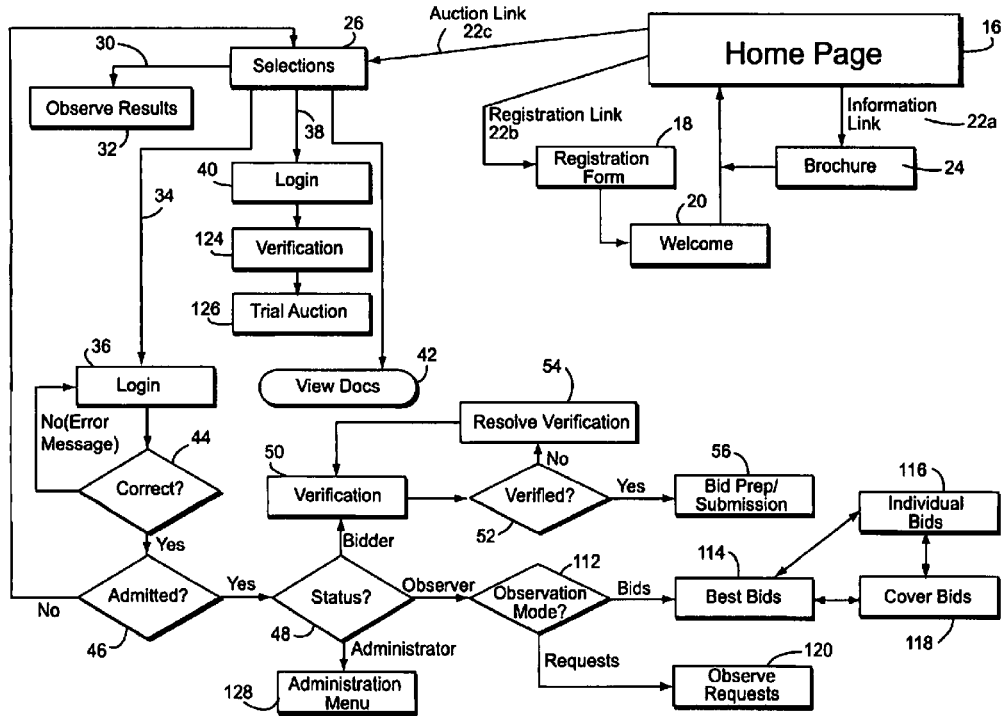

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-46 and 51-54 is confirmed.

Claims 47-50 were previously cancelled.

\* \* \* \* \*